United States Patent
Pike et al.

(10) Patent No.: US 11,601,262 B2
(45) Date of Patent: Mar. 7, 2023

(54) DISTRIBUTED KEY MANAGEMENT SYSTEM

(71) Applicant: Dell Products L.P., Round Rock, TX (US)

(72) Inventors: Jimmy D. Pike, Georgetown, TX (US); Robert W. Hormuth, Cedar Park, TX (US); Gaurav Chawla, Austin, TX (US); Mark Steven Sanders, Roanoke, VA (US); Elie Jreij, Pflugerville, TX (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 17/071,268

(22) Filed: Oct. 15, 2020

(65) Prior Publication Data
US 2022/0123920 A1    Apr. 21, 2022

(51) Int. Cl.
H04L 9/08    (2006.01)
H04L 9/40    (2022.01)

(52) U.S. Cl.
CPC .......... *H04L 9/083* (2013.01); *H04L 9/0827* (2013.01); *H04L 9/0891* (2013.01); *H04L 9/0894* (2013.01); *H04L 63/08* (2013.01)

(58) Field of Classification Search
CPC ..... H04L 9/083; H04L 9/0827; H04L 9/0891; H04L 9/0894; H04L 63/08
See application file for complete search history.

(56) References Cited

U.S. PATENT DOCUMENTS

| | | |
|---|---|---|
| 9,049,011 B1 | 6/2015 | Agrawal |
| 9,698,979 B2 | 7/2017 | Armstrong et al. |

(Continued)

FOREIGN PATENT DOCUMENTS

| | | |
|---|---|---|
| CN | 105141616 A | 12/2015 |
| CN | 111460429 A | 7/2020 |
| WO | WO 2020/114377 A1 | 6/2020 |

OTHER PUBLICATIONS

Zhou, B., Li, H., & Xu, L. (Jun. 2018). An authentication scheme using identity-based encryption & blockchain. In 2018 IEEE Symposium on computers and communications (ISCC) (pp. 00556-00561). (Year: 2018).*

(Continued)

*Primary Examiner* — Catherine Thiaw
(74) *Attorney, Agent, or Firm* — Joseph Mencher

(57) ABSTRACT

A distributed key management system includes a first SCP subsystem coupled to second SCP subsystems via a network. The first SCP subsystem establishes secure communication channels with the second SCP subsystems, and a first key management subsystem in the first SCP subsystem retrieves enabling key(s) for communicating via the secure communication channels from a second key management subsystem in one of the second SCP subsystems, and stores the enabling key(s). The first key management subsystem then receives a first enabling key request from the first SCP subsystem and determines whether the first SCP subsystem is trusted. If the first SCP subsystem is trusted, the first key management subsystem provides the first SCP subsystem access to the at least one enabling key. If the first SCP subsystem is not trusted, the first key management subsystem prevents the first SCP subsystem from accessing the at least one enabling key stored.

20 Claims, 17 Drawing Sheets

(56) References Cited

U.S. PATENT DOCUMENTS

| | | |
|---|---|---|
| 11,431,514 B1 * | 8/2022 | Geethakumar ....... H04L 9/3231 |
| 2003/0055898 A1 | 3/2003 | Yeager et al. |
| 2018/0234251 A1 | 8/2018 | Oberheide et al. |
| 2018/0324162 A1 * | 11/2018 | Teshome ................. H04L 63/12 |
| 2018/0337771 A1 * | 11/2018 | Baker ................... G06F 21/575 |
| 2019/0026234 A1 * | 1/2019 | Harnik ............... H04L 63/0428 |
| 2019/0199693 A1 | 6/2019 | Vityaz |
| 2020/0259667 A1 | 8/2020 | Garnier et al. |
| 2020/0304319 A1 * | 9/2020 | Wei ...................... H04L 63/123 |

OTHER PUBLICATIONS

Cilardo, Alessandro, Mazzeo, Antonino, Romano, Luigi et al. "An FPGA-based key-store for improving the dependability of security services". In : 10th IEEE international workshop on object-oriented real-time dependable systems. IEEE, 2005. p. 389-396. (Year: 2005).*

English Translation of Search Report of Taiwan Patent Application No. 110125104, Date of Completion: Jun. 17, 2022, 1 Page.

PCT International Search Report and Written Opinion, Application No. PCT/US2021/029746, dated Aug. 5, 2021, 15 pages.

* cited by examiner

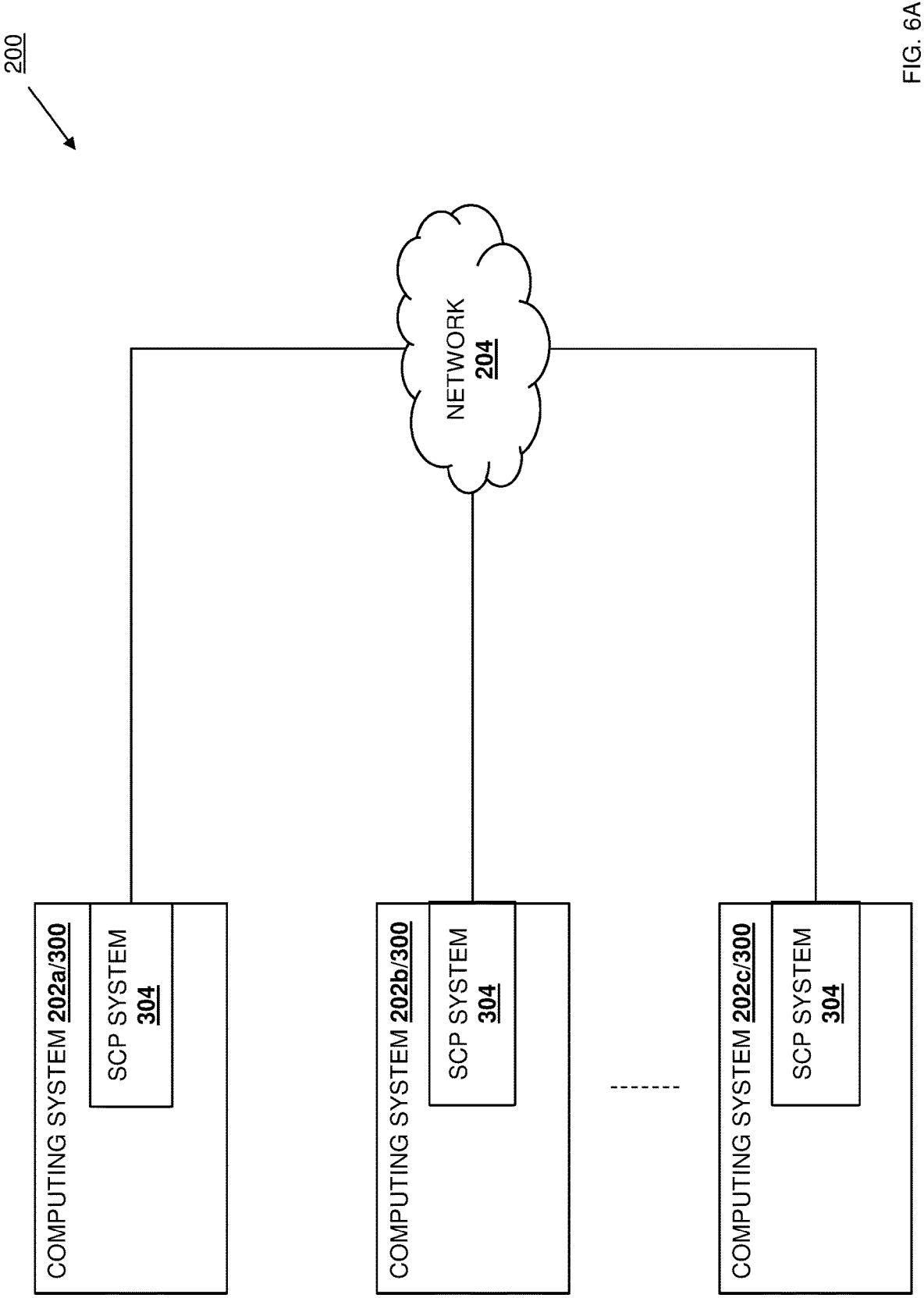

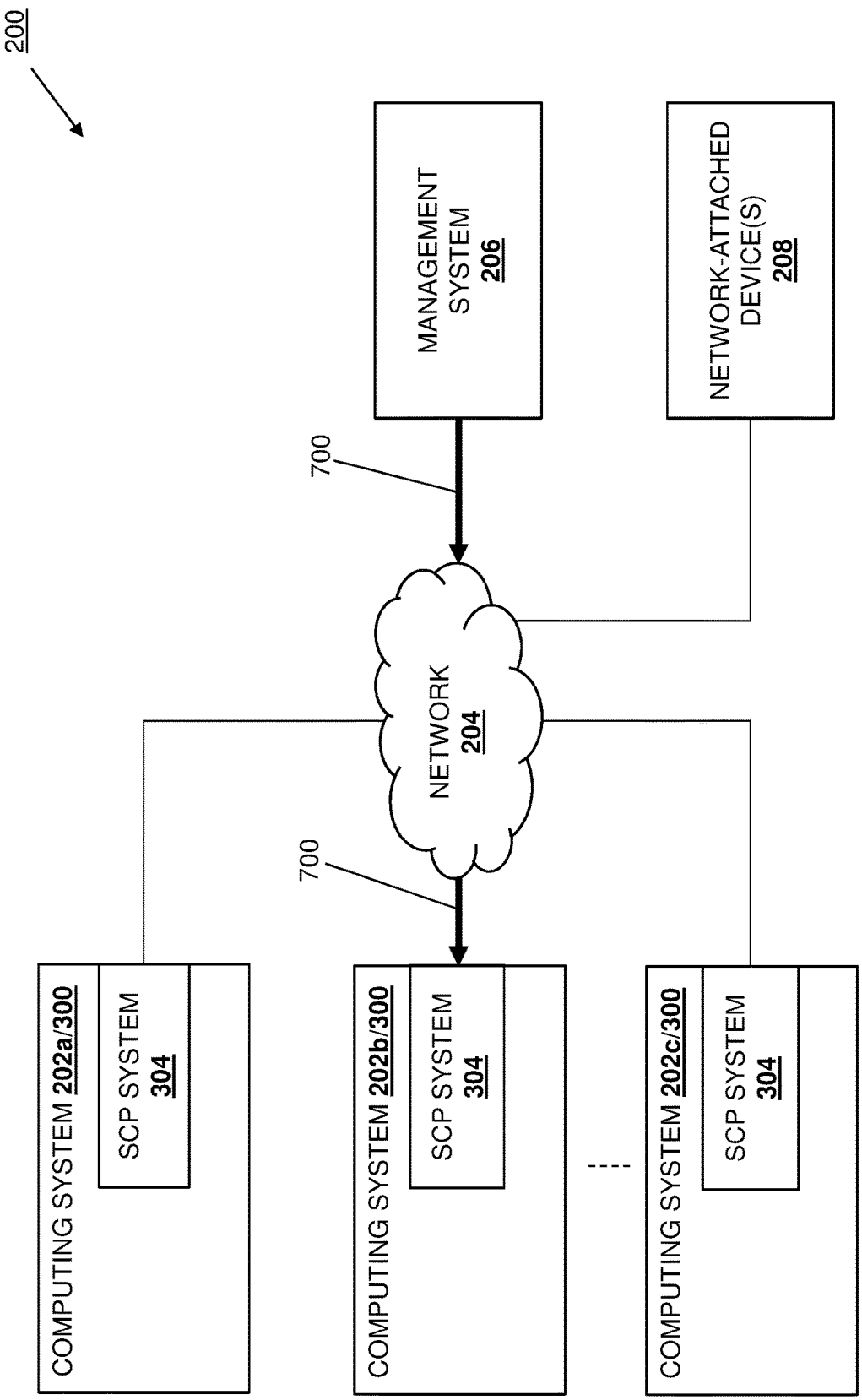

DISTRIBUTED KEY MANAGEMENT SYSTEM

BACKGROUND

The present disclosure relates generally to information handling systems, and more particularly to providing key management for information handling systems in a distributed manner.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing systems known in the art may be configured to communicate with and/or access each other via the use of keys (e.g., public/private key pairs). In conventional systems, those keys may be managed by a centralized key management system that provides a secure key store/database that each server device must access in order to retrieve the keys needed for secure communications, and such conventional key management systems typically include multiple redundant key management subsystems in order to provide high availability of the keys stored therein. However, the centralized configuration of such conventional key management systems introduces a target for attacks to gain unauthorized access to the keys, and requires purely redundant key management subsystems that perform no functions other than to take over key management functionality in the event the primary key management subsystem becomes unavailable.

Accordingly, it would be desirable to provide a key management system that addresses the issues discussed above.

SUMMARY

According to one embodiment, an Information Handling System (IHS) includes a first processing subsystem; a first memory subsystem that is coupled to the first processing subsystem and that includes instructions that, when executed by the first processing subsystem, cause the first processing subsystem to provide an enabling key utilization engine; a second processing subsystem that is coupled to the first processing subsystem; a second memory subsystem that is coupled to the second processing subsystem and that includes instructions that, when executed by the second processing subsystem, cause the second processing subsystem to provide a key management engine that is configured to: retrieve, from a key management subsystem in one of a plurality of second System Control Processor (SCP) subsystems, at least one enabling key for communicating via respective secure communication channels with each of the plurality of second SCP subsystems; store the at least one enabling key in a key management database that is coupled to the second processing subsystem; receive, from the enabling key utilization engine, a first enabling key request; determine whether the IHS is trusted; provide, in response to receiving the first enabling key request and determining that the IHS is trusted, the enabling key utilization engine access to the at least one enabling key stored in the key management database; and prevent, in response to receiving the first enabling key request and determining that the IHS is not trusted, the enabling key utilization engine from accessing the at least one enabling key stored in the key management database.

BRIEF DESCRIPTION OF THE DRAWINGS

FIG. 6A is a schematic view illustrating an embodiment of the networked system of FIG. 2 with the computing system 300 of FIG. 3 having the SCP subsystem of FIG. 4 and operating during the method of FIG. 5.

FIG. 7 is a schematic view illustrating an embodiment of the networked system of FIG. 2 with the computing system 300 of FIG. 3 having the SCP subsystem of FIG. 4 and operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
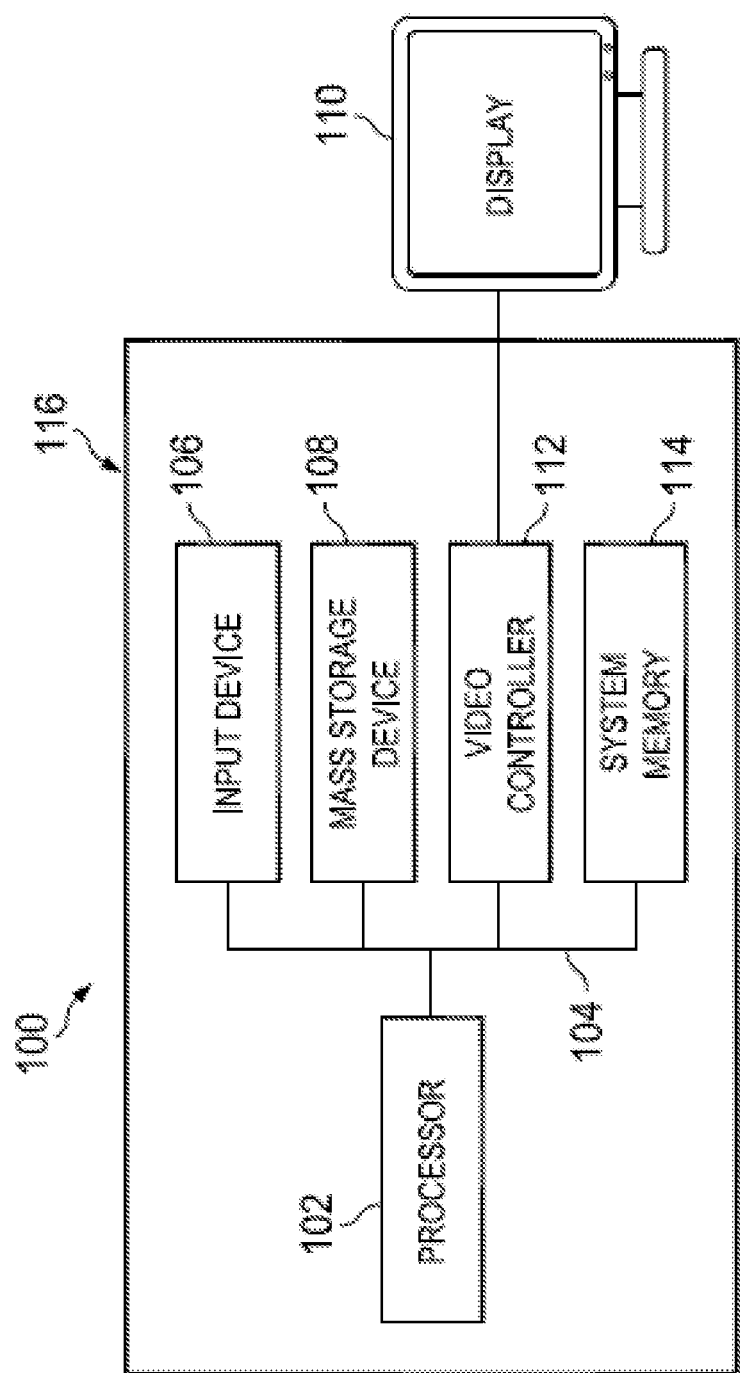
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
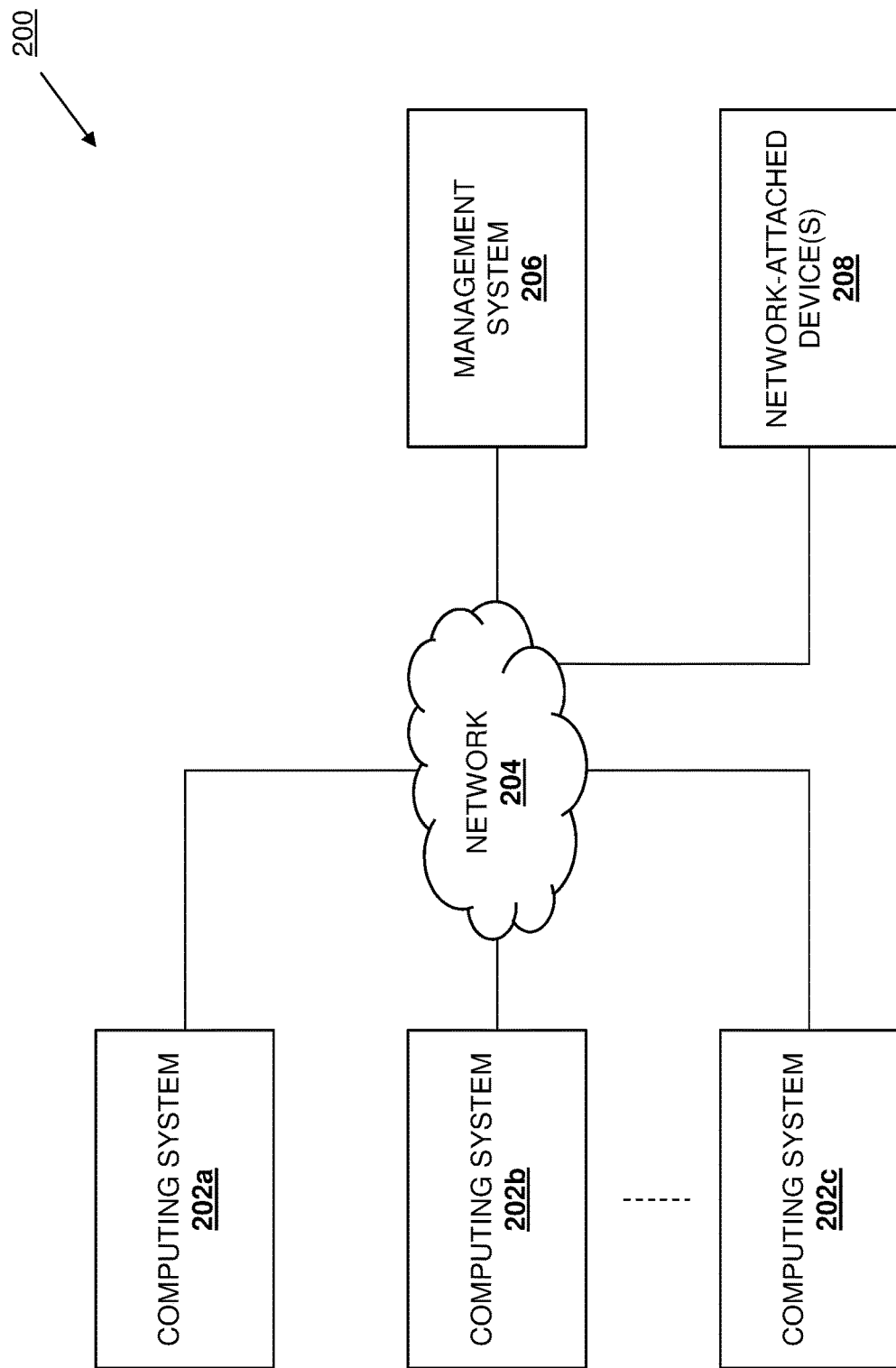
FIG. 2 is a schematic view illustrating an embodiment of a networked system.

Referring now to FIG. 2, an embodiment of a networked system 200 is illustrated in which the distributed key management system of the present disclosure may be utilized. In the illustrated embodiment, the networked system 200 includes a plurality of computing systems 202*a*, 202*b*, and up to 202*c*. In an embodiment, the computing system 202*a*-202*c* may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202*a*-202*c* discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202*a*-202*c* (e.g., an SCP manager for the SCP subsystems included in the computing systems 202*a*-202*c* discussed below, etc.). In the illustrated embodiment, one or more network-attached devices 208 are also coupled to the network 204. In an embodiment, the network-attached device(s) 208 may be provided by a variety of different network-attached devices that are accessible to the computing systems 202*a*-202*c* via the network 204, and in specific examples may be provided by one or more Non-Volatile Memory express (NVMe) storage devices that may be configured to provide a network-attached storage system for any or all of the computing systems 202*a*-202*c*. However, while a specific networked system 200 has been illustrated and described, one of skill in the art in possession of the present disclosure will recognize that the distributed key management system of the present disclosure may be utilized with a variety of components and component configurations, and/or may be provided in a variety of computing system/network configurations, while remaining within the scope of the present disclosure as well.

Figure 3A:
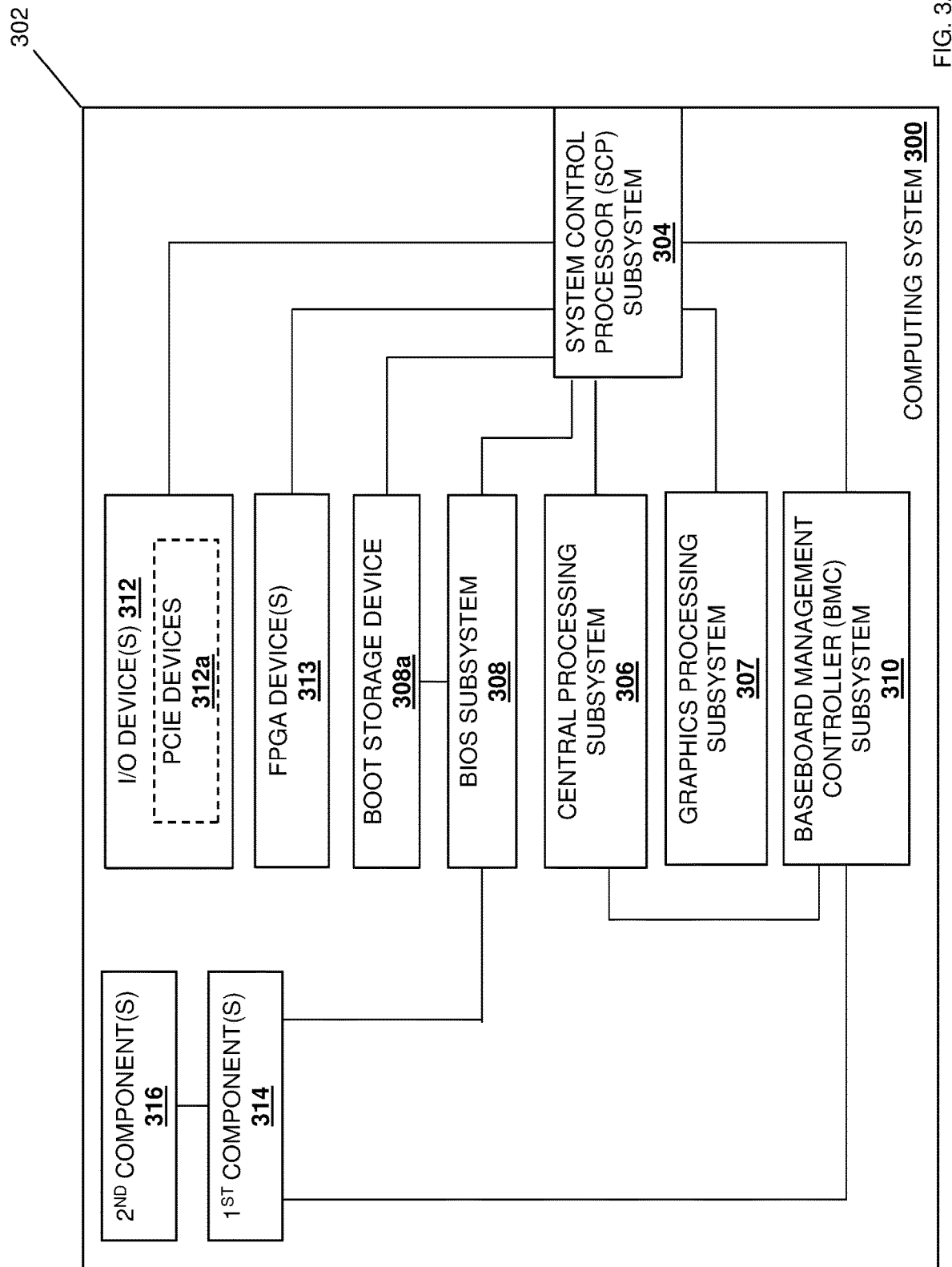
FIG. 3A is a schematic view illustrating an embodiment of a computing system that may be included in the networked system of FIG. 2 and that may utilize the distributed key management system of the present disclosure.

Referring now to FIG. 3A, an embodiment of a computing system 300 is illustrated that may provide any or all of the computing systems 202*a*-202*c* discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing systems that are configured to operate similarly as the computing system 300 discussed below. In the illustrated embodiment, the computing system 300 includes a chassis 302 that houses the components of the computing system 300, only some of which are illustrated below.

For example, the chassis 302 may house a System Control Processor (SCP) subsystem 304 that is provided according to the teachings of the present disclosure to perform the distributed key management functionality that is discussed in further detail below. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, and the secure communication functionality described by the inventors of the present disclosure in U.S. patent application Ser. No. 17/079,737, filed on Oct. 26, 2020, the disclosures of which is incorporated herein by reference in their entirety. However, while illustrated and described as an enhanced SmartNIC device provided by an SCP subsystem, one of skill in the art in possession of the present disclosure will appreciate that the SCP subsystem 304 may be replaced by a variety of other subsystems that are configured to perform the functionality discussed below while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing subsystem 306 that is coupled to the SCP subsystem 304 (e.g., via a Compute Express Link (CxL)), and which may include the processor 102 discussed above with reference to FIG. 1, a Central Processing Unit (CPU) such as a x86 host processor, a CPU memory such as x86 host processor memory, and/or a variety of other processing components that would be apparent to one of skill in the art in possession of the present disclosure. The chassis 302 may also house a graphics processing subsystem 307 that is coupled to the SCP subsystem 304, and which may include the processor 102 discussed above with reference to FIG. 1, a Graphics Processing Unit (GPU), a GPU memory, and/or by a variety of other processing components that would be apparent to one of skill in the art in possession of the present disclosure. As will be appreciated by one of skill in the art in possession of the present disclosure, in the examples illustrated below, the graphics processing subsystem 307 connects to the central processing subsystem 306 via the SCP subsystem 304 such that the SCP subsystem 304 acts as a "host" for the graphics processing subsystem 307, although other central processing subsystem/graphics processing subsystem configurations will fall within the scope of the present disclosure as well.

The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a boot storage device 308a that is coupled to the SCP subsystem 304 and the BIOS subsystem 308, and that one of skill in the art in possession of the present disclosure will recognize may store a boot image that may be accessible to and utilized by the BIOS subsystem 308 during boot operations. For example, the boot storage device 308a may be provided by Boot Optimized Storage Solution (BOSS) available from DELL® Inc. of Round Rock, Tex., United States, although other boot storage devices will fall within the scope of the present disclosure as well. In the illustrated embodiment, the chassis 302 may also house a Baseboard Management Controller (BMC) subsystem 310 that is coupled to the SCP subsystem 304 and the central processing subsystem 306 (e.g., via a Peripheral Component Interconnect express (PCIe) link), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure.

The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well. The chassis 302 may also house one or more Field Programmable Gate Array (FPGA) device(s) 313 that are coupled to the SCP subsystem 304, and that as discussed below may be programmed to perform any of a variety of functions for the computing system 300 and/or the SCP subsystem 304.

Figure 3B:
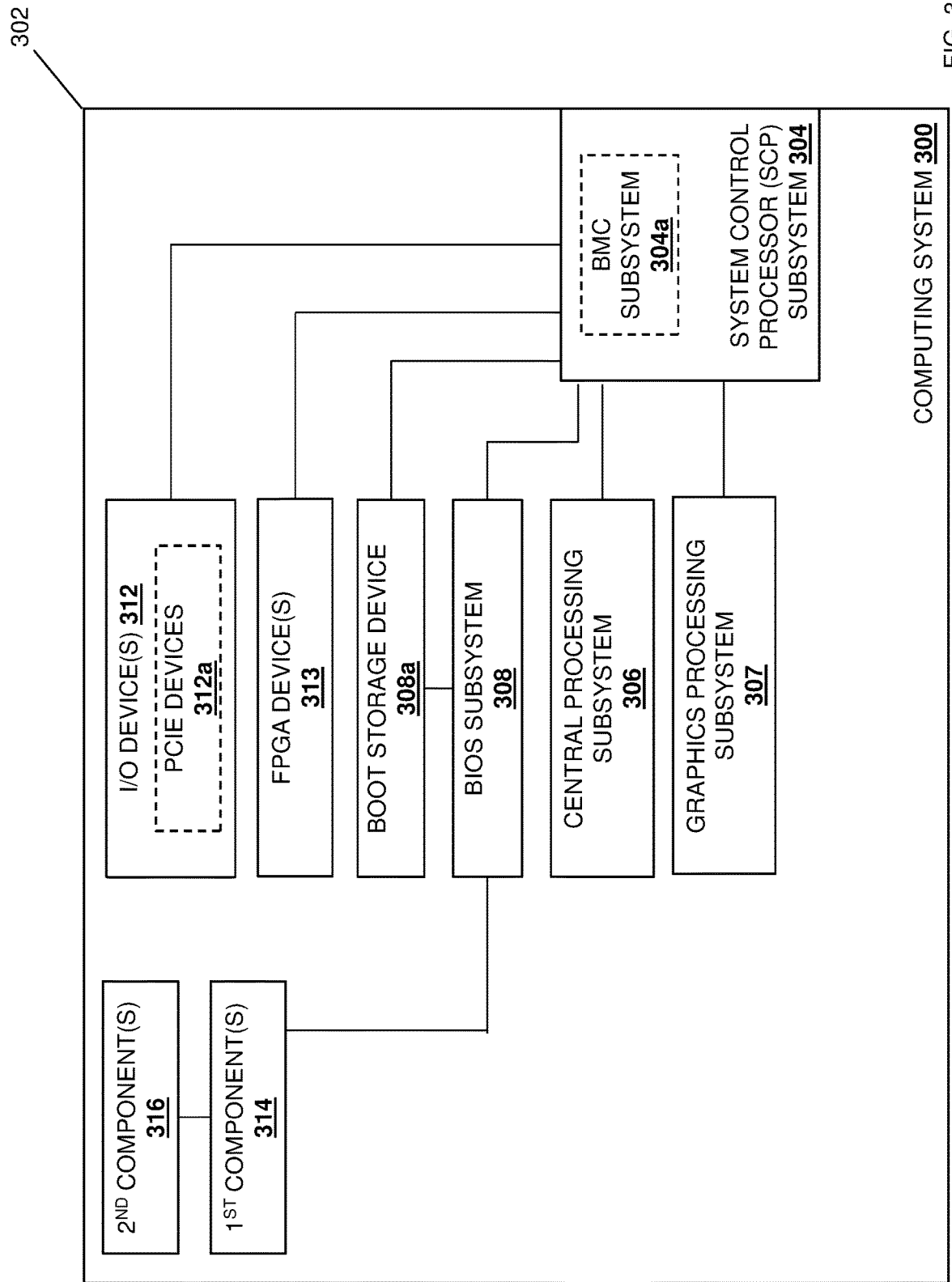
FIG. 3B is a schematic view illustrating an embodiment of a computing system that may be included in the networked system of FIG. 2 and that may utilize the distributed key management system of the present disclosure.

The chassis 302 may also house one or more first components 314 that are coupled to each of the BIOS subsystem 308 and the BMC subsystem 310, and one or more second components 316 that are coupled to at least one of the first components 314. In specific examples, the first component(s) 314 and the second component(s) 316 may include a Complex Programmable Logic Device (CPLD), a power system, and/or a variety of other computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304a that performs the functionality of the BMC subsystem 310 in FIG. 3A.

Figure 4:
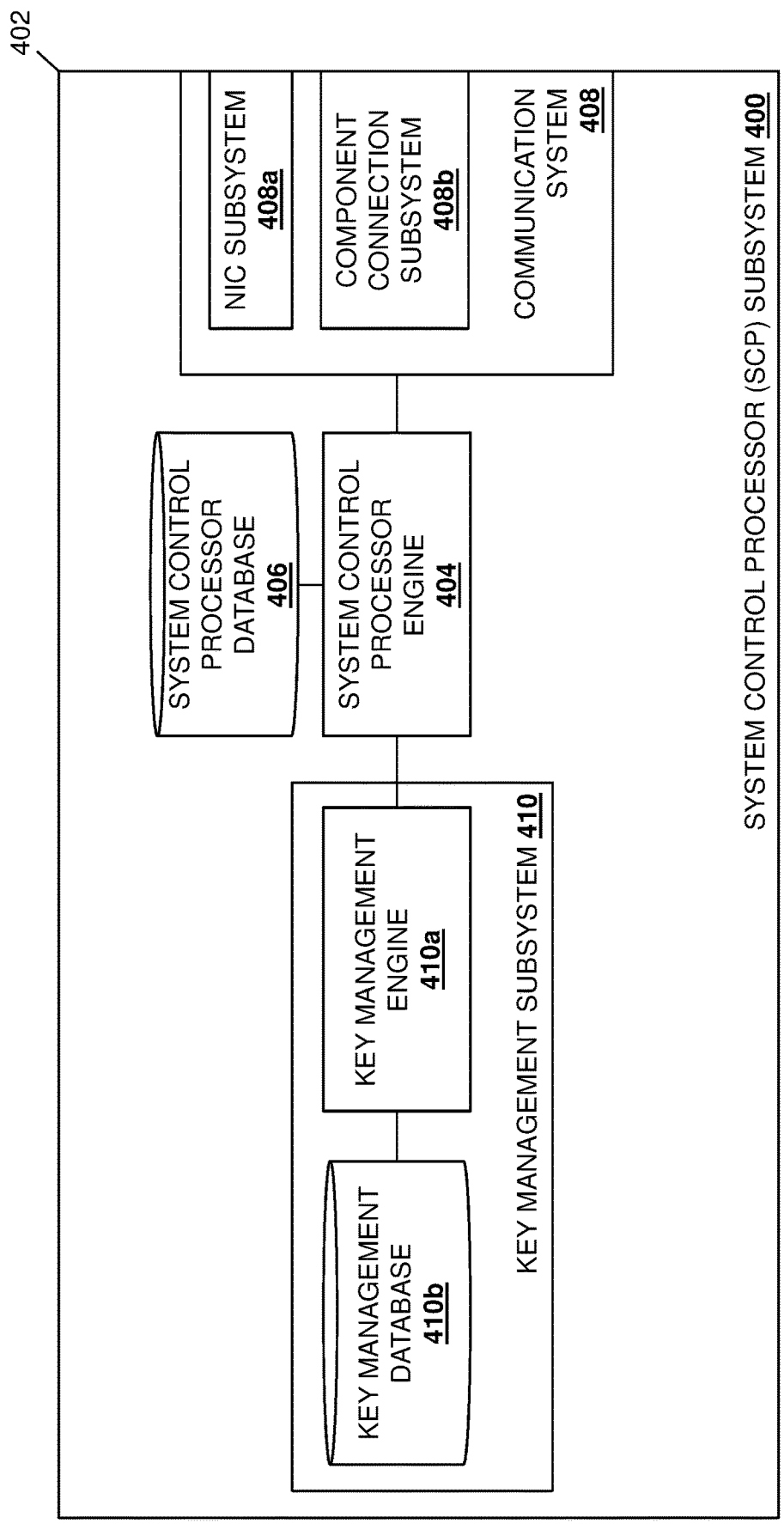
FIG. 4 is a schematic view illustrating an embodiment of an SCP subsystem that may be included in the computing device of FIG. 3A or 3B, and that may provide the distributed key management system of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 400, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 302 may support an SCP processing subsystem including one or more SCP processors (not illustrated, but which may include the processor 102 discussed above with reference to FIG. 1) and an SCP memory subsystem (not illustrated, but which may include the memory 114 discussed above with reference to FIG. 1) that is coupled to the SCP processing subsystem and that includes instructions that, when executed by the SCP processing subsystem, cause the SCP processing subsystem to provide an SCP engine 404 that is configured to perform the functionality of the SCP engines and/or SCP subsystems discussed below. In a specific example, the SCP processing subsystem providing the SCP engine 404 may be provided by ARM processor cores in an ARM-based processor, although other processing systems will fall within the scope of the present disclosure as well.

Furthermore, the chassis 302 may support key management subsystem 410 that may include a key management processing subsystem including one or more key management processors (not illustrated, but which may include the processor 102 discussed above with reference to FIG. 1) and a key management memory subsystem (not illustrated, but which may include the memory 114 discussed above with reference to FIG. 1) that is coupled to the key management processing subsystem and that includes instructions that, when executed by the key management processing subsystem, cause the key management processing subsystem to provide a key management engine 410a that is configured to perform the functionality of the key management engines and/or key management subsystems discussed below.

As will be appreciated by one of skill in the art in possession of the present disclosure, separate and segregated processing subsystems that are utilized to provide the SCP engine 404 and the key management engine 410a may be provided by different processing systems in some embodiments, or by the same processing system (e.g., separate and segregated processor cores) in other embodiments. As such, the SCP subsystem 400 may include a plurality of processing subsystems (e.g., a first processing subsystem and a second processing subsystem) that provide a key utilization engine and a key management engine, respectively, that operate independently and/or otherwise function in the manner discussed in further detail below. In specific examples, the key management engine 410a may provide an Application Programming Interface (API) that may only be used by the SCP engine 404 to interact with the key management engine 410a in the manner described below, although other techniques for providing the SCP engine/key management engine communications/interactions discussed below will fall within the scope of the present disclosure as well.

The chassis 302 may also support an SCP storage subsystem (not illustrated, but which may include the storage 108 discussed above with reference to FIG. 1, the SCP memory system discussed above, etc.) that is coupled to the SCP engine 404 (e.g., via a coupling between the SCP storage subsystem and the SCP processing subsystem), and that may include an SCP database 406 that may store any of the information utilized by the SCP engine 404 as discussed below. The chassis 302 may also support a key management storage subsystem (not illustrated, but which may include the storage 108 discussed above with reference to FIG. 1) that is coupled to the key management engine 410a (e.g., via a coupling between the key management storage subsystem and the key management processing subsystem), and that may include a key management database 410b that is included in the key management subsystem 410 and that may store any of the information utilized by the key management engine 410a as discussed below. For example, the key management database 410b may provide a secure key store for the storage of the enabling key(s) described in further detail below.

As will be appreciated by one of skill in the art in possession of the present disclosure, separate and segregated storage subsystems that are utilized to provide the SCP database 406 and the key management database 410b may be provided by different storage systems in some embodiments, or by the same storage system (e.g., separate and segregated storage zones) in other embodiments. As such, the SCP subsystem 400 may include a plurality of storage subsystems (e.g., a first storage subsystem and a second storage subsystem) that provide a key utilization database and a key management database, respectively, that are independently and securely accessible separately, and/or otherwise function in the manner discussed in further detail below.

The chassis 402 may also support a communication system 408 that is coupled to the SCP engine 404 (e.g., via a coupling between the communication system 408 and the SCP processing subsystem) and that, in the illustrated embodiment, includes a Network Interface Controller (NIC) subsystem 408a (e.g., an Ethernet subsystem) that is configured to connect the SCP subsystem 400 to the network 204 discussed above with reference to FIG. 2, a component connection subsystem 408b that is configured to couple the SCP subsystem 400 to any of the components included in and/or connected to the computing system 300 of FIGS. 3A and 3B, as well as any other communication components (e.g., wireless communication systems (e.g., BLUETOOTH®, Near Field Communication (NFC) components, WiFi components, etc.)) that would be apparent to one of skill in the art in possession of the present disclosure.

As such, the communication system 408 may include any of the connections between the SCP subsystem 400 and the network 204, the central processing subsystem 306, the graphics processing subsystem 307, the BIOS subsystem 308, the boot storage device 308a, the BMC subsystem 310, the I/O device(s) 312, the FPGA device(s) 313, and/or any other components utilized with the computing system 202a/300. For example, the component connection subsystem 408b may include a CxL Root .mem/.cache subsystem coupled to the central processing subsystem 306, and Out-Of-Band (OOB) management subsystem coupled to the BMC subsystem 310, and a CxL host subsystem coupled to the components in the computing system 300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components (e.g., a local memory, embedded FPGA device(s), a Non-Volatile Memory express (NVMe) emulation subsystem between the SCP cloning engine 404 and the CxL Root .mem/.cache subsystem discussed above, etc.) and/or component configurations for providing the functionality discussed below while remaining within the scope of the present disclosure as well.

Figure 5:
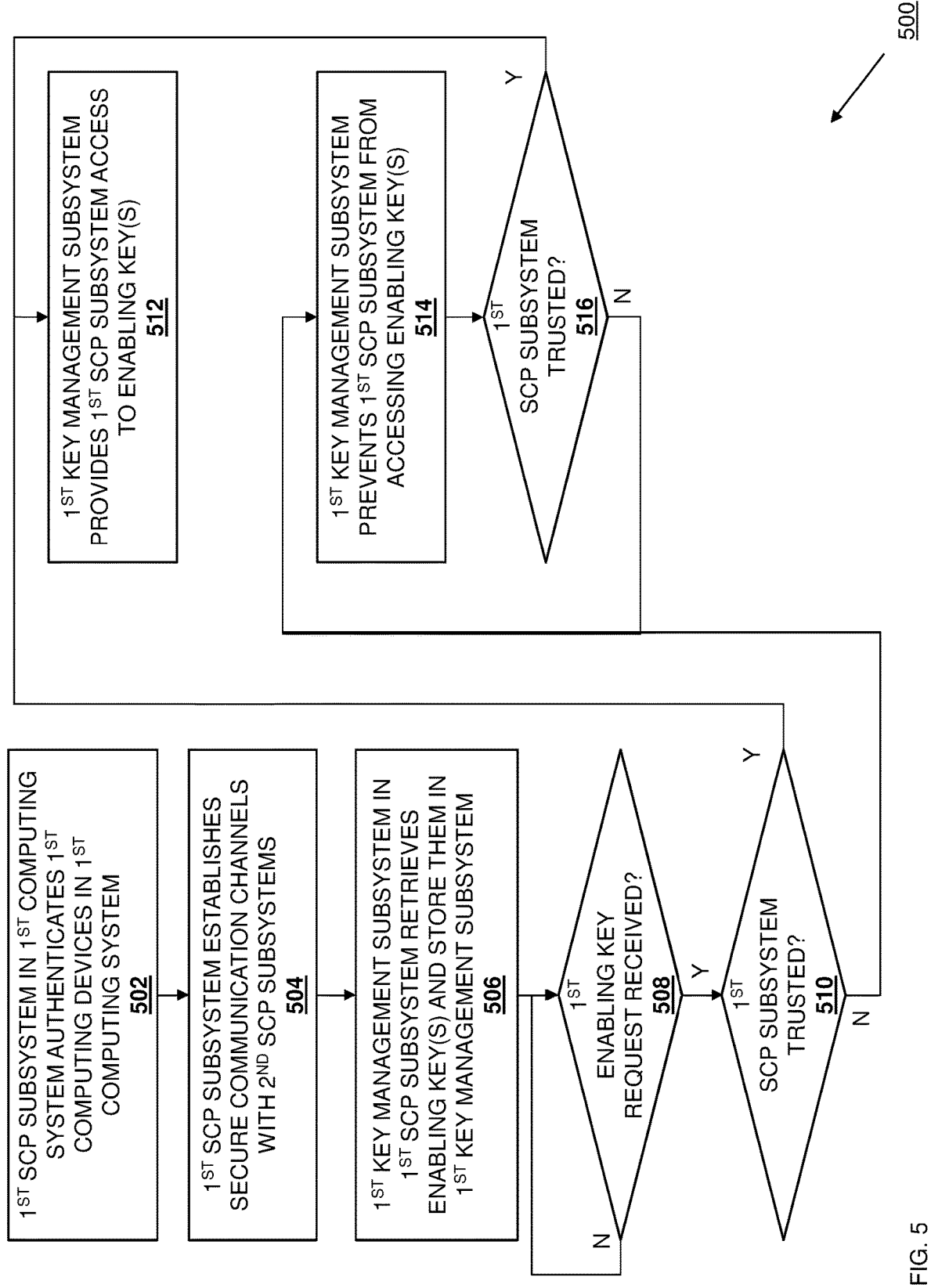
FIG. 5 is a flow chart illustrating an embodiment of a method for providing distributed key management.

Referring now to FIG. 5, an embodiment of a method 500 is illustrated for providing distributed key management. As discussed below, embodiments of the systems and methods of the present disclosure may utilize SCP subsystems that provide a platform root-of-trust for their computing system, and that also operate to establish distributed secure communication channels with each other to provide a secure SCP communication fabric, in order to provide a distributed, immutable, key management system for use by the SCP subsystems in communicating via the secure SCP communication fabric. For example, the distributed key management system of the present disclosure includes a first SCP subsystem coupled to second SCP subsystems via a network. The first SCP subsystem establishes secure communication channels with the second SCP subsystems, and a first key management subsystem in the first SCP subsystem retrieves enabling key(s) for communicating via the secure communication channels from a second key management subsystem in one of the second SCP subsystems, and stores the enabling key(s). The first key management subsystem then receives a first enabling key request from the first SCP subsystem and determines whether the first SCP subsystem is trusted. If the first SCP subsystem is trusted, the first key management subsystem provides the first SCP subsystem access to the at least one enabling key. If the first SCP subsystem is not trusted, the first key management subsystem prevents the first SCP subsystem from accessing the at least one enabling key stored. As such, decentralized, distributed key management is enabled that provides key management redundancy using SCP subsystems that operate to provide a variety of other functionality, and thus are not purely redundant subsystems like those utilized in conventional key management subsystems.

The method 500 begins at block 502 where a first SCP subsystem in a first computing system authenticates first computing devices in a first computing system that includes that first SCP subsystem. With reference to FIG. 6A, in an embodiment of block 502, any of the SCP subsystems 304 in the computing systems 202a/300, 202b/300, and/or 202c/300 may operate to authenticate computing devices in its respective computing system. For example, the SCP engine 404 in each of the SCP subsystems 304/400 in the computing systems 202a-202c/300 may be configured at block 502 to perform the platform root-of-trust functionality described by the inventors of the present disclosure in U.S. patent application Ser. No. 17/027,835, filed on Sep. 22, 2020, the disclosure of which is incorporated herein by reference in its entirety.

Thus, as described in that application, each SCP subsystem may initialize, validate its SCP subsystem initialization information (e.g., anSCP boot image) as part of its SCP initialization operations, use the validated SCP subsystem initialization information to complete its SCP initialization operations, validate BIOS subsystem initialization information (e.g., a BIOS boot image) for the BIOS subsystem in its computing system so that the BIOS subsystem may utilize that BIOS subsystem initialization information to complete BIOS subsystem initialization operations, validate BMC subsystem initialization information (e.g., a BMC boot image) for the BMC subsystem in its computing system so that the BMC subsystem may utilize that BMC subsystem initialization information to complete BMC subsystem initialization operations, and/or validate I/O device initialization information (e.g., an I/O boot image) for the I/O device(s) in its computing system so that the I/O device(s) may utilize that I/O device initialization information to complete I/O device initialization operations. As such, as described in that application, the SCP subsystem in each computing system may ensure the validated operations of each of the subsystems/devices/components included in its computing system.

Furthermore, as also described in that application, the "chain-of-trust" between any SCP subsystem and the systems/devices/components included in its computing system that are directly connected to that SCP subsystem may be extended to systems/devices/components included in its computing system that are indirectly coupled to that SCP subsystem. For example, any validated subsystem/device/component that is directly connected to an SCP subsystem in a computing system may operate to ensure the validated operations of each of the subsystems/devices/components in that computing system that it is directly connected to such that systems/devices/components that are indirectly connected to the SCP subsystem are validated as well. Further still, validated systems/devices/components that are indirectly connected to the SCP subsystem in any computing system may operate to ensure the validated operations of each of the subsystems/devices/components in its computing system that it is directly connected to, and so on. As such, a "chain-of-trust" may be provided between the SCP subsystem and every subsystem/device/component in its computing system. As also discussed in that application, the SCP subsystem in any computing system may also operate to validate firmware updates for the subsystems/devices/components in its computing system, cause the erasure of portions of non-volatile storage subsystems in its computing system, and/or perform any other functionality described in that application during the method 500.

In an embodiment of block 502, the authentication of any SCP subsystem and the subsystems/devices/components in any computing system may allow the key management subsystem in that computing system to authenticate that SCP subsystem as well. For example, at block 502, the key management engine 410*a* in the key management subsystem 410 included in the computing systems 202*a*/400, 202*b*/400, and/or 202*c*/300 may determine that the SCP subsystem in that computing system is authenticated and, in response, may generate key store access key(s) (e.g., public/private key pair(s) and/or other keys known in the art) and provide those key store access key(s) to that SCP subsystem. In specific embodiments, the key store access key(s) may provide complete access to any key store with which they are associated, or may be configured to enable different access capabilities for the SCP subsystem to which they're provided. As such, in some embodiments, one or more key store access key(s) may be provided that enable key store access for each SCP subsystem in the networked system 200 to their corresponding key store/database, or unique key store access key(s) may be provided to different SCP subsystems in the networked system 200 in order to enable different levels of access to their corresponding key storage/database (e.g., via different enabling key(s)).

Figure 6B:
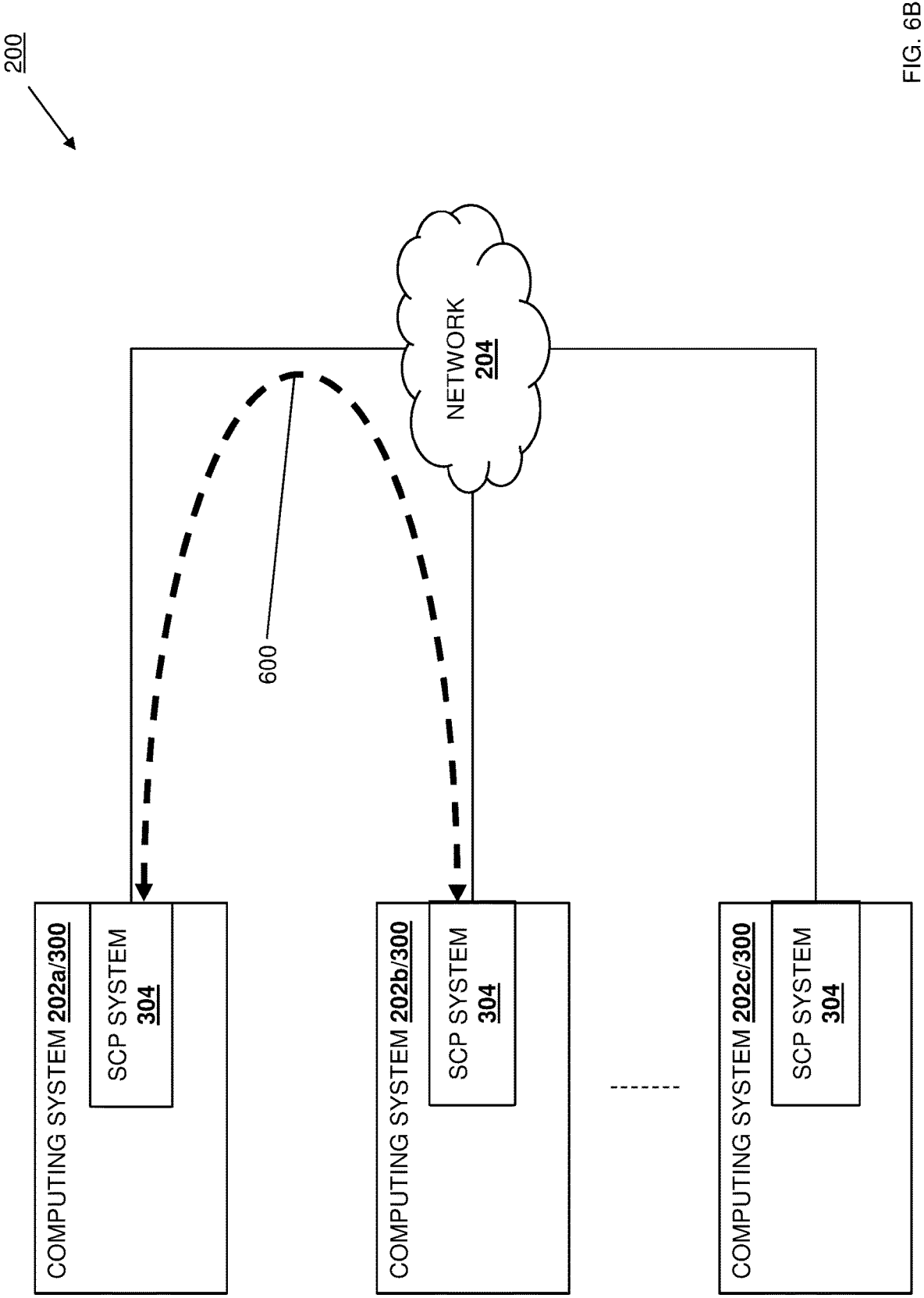
FIG. 6B is a schematic view illustrating an embodiment of the networked system of FIG. 2 with the computing system 300 of FIG. 3 having the SCP subsystem of FIG. 4 and operating during the method of FIG. 5.
Figure 6C:
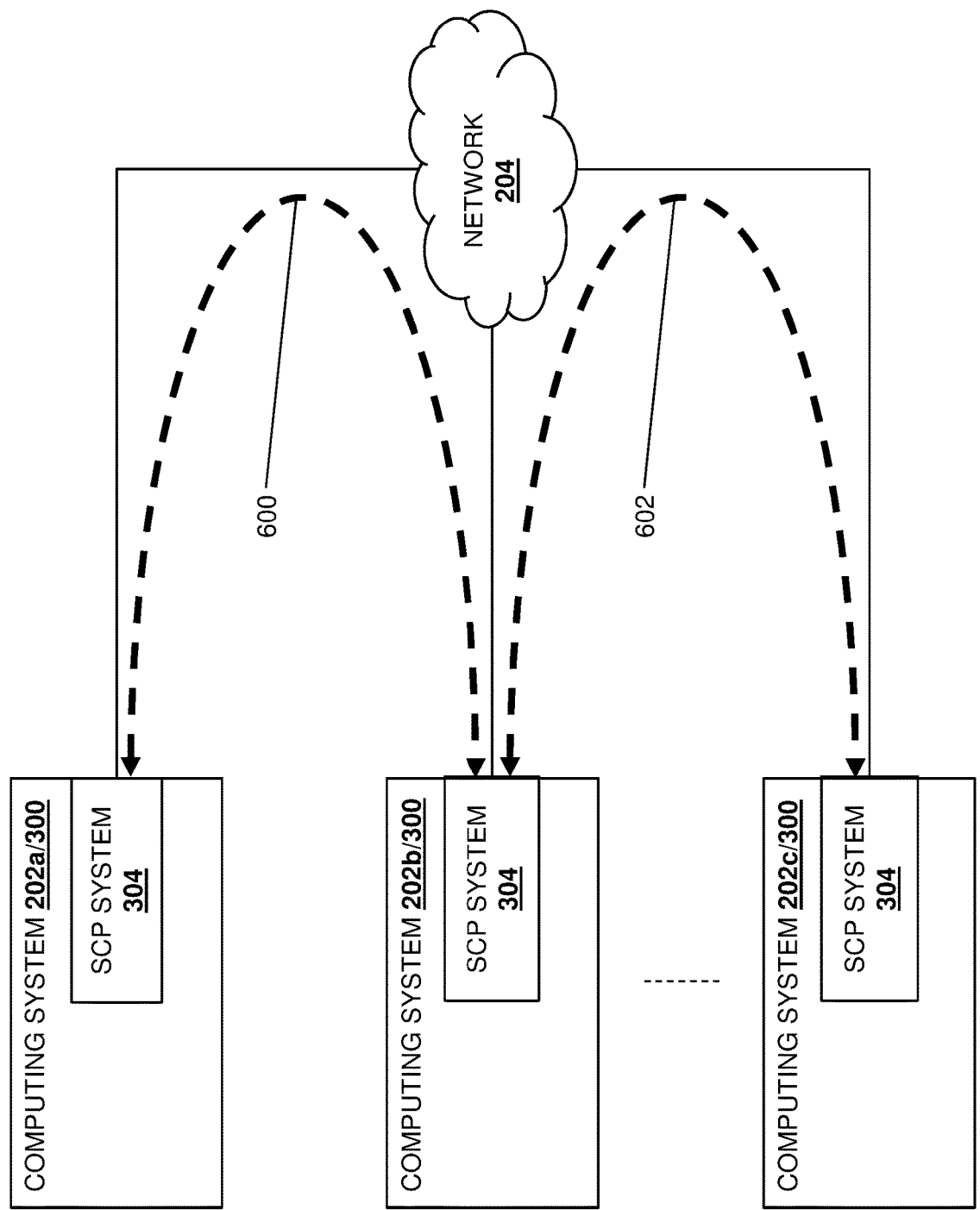
FIG. 6C is a schematic view illustrating an embodiment of the networked system of FIG. 2 with the computing system 300 of FIG. 3 having the SCP subsystem of FIG. 4 and operating during the method of FIG. 5.
Figure 6D:
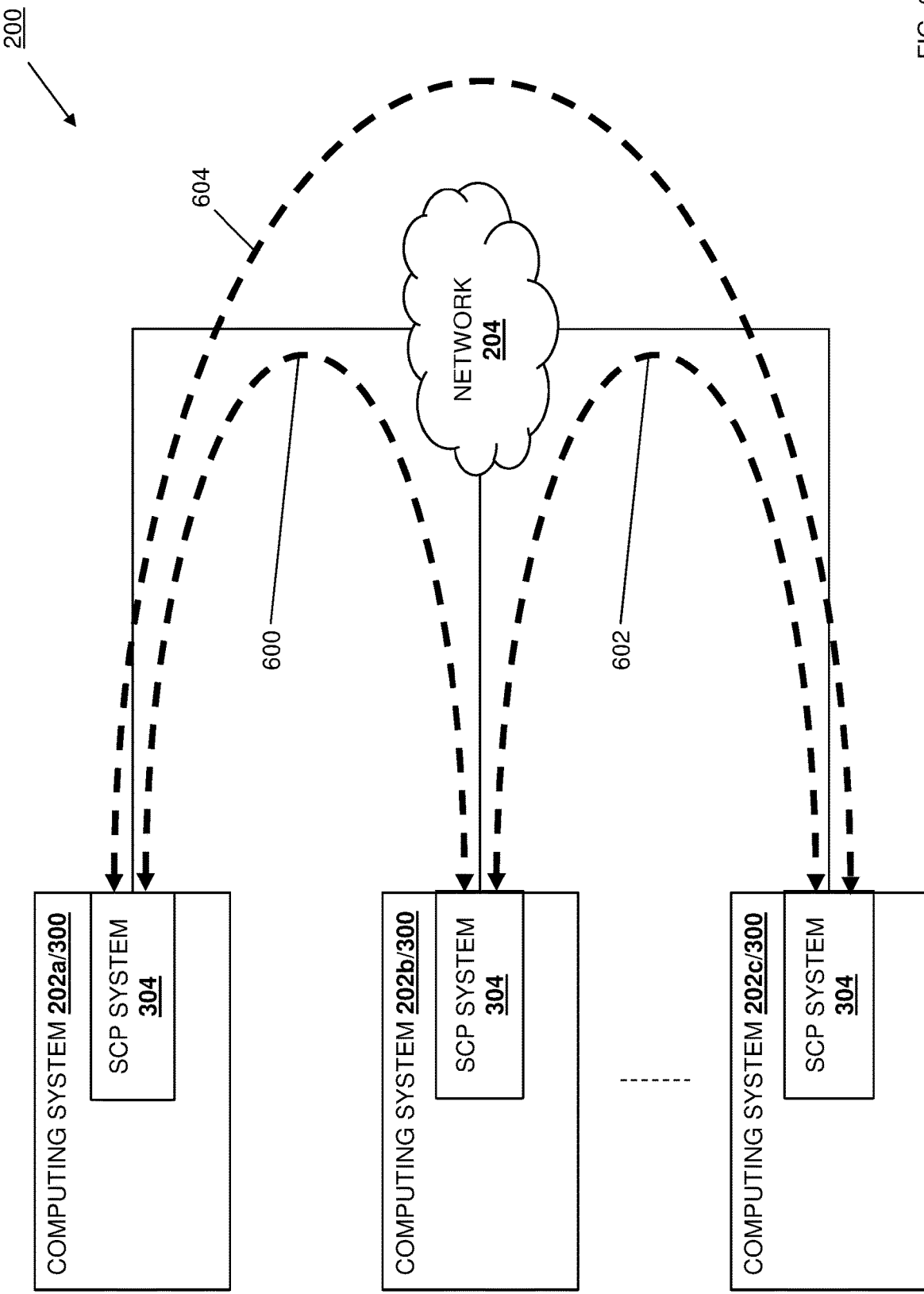
FIG. 6D is a schematic view illustrating an embodiment of the networked system of FIG. 2 with the computing system 300 of FIG. 3 having the SCP subsystem of FIG. 4 and operating during the method of FIG. 5.

The method 500 then proceeds to block 504 where the first SCP subsystem establishes secure communication channels with second SCP subsystems. With reference to FIGS. 6B, 6C, and 6D, in an embodiment of block 504, the SCP subsystems 304 in the computing systems 202*a*/300, 202*b*/300, and/or 202*c*/300 may operate to establish secure communications channels 600, 602, and 604 with each other. For example, the SCP engine 404 in each of the SCP subsystems 304/400 in the computing systems 202*a*-202*c*/300 may be configured at block 604 to perform the secure communication functionality described by the inventors of the present disclosure in U.S. patent application Ser. No. 17/079,737, filed on Oct. 26, 2020, the disclosure of which is incorporated herein by reference in its entirety.

Thus, as described in that application, the SCP subsystem 304 in the computing system 202*b*/300 may identify the SCP subsystem 304 in the computing system 202*a*/300, sign a second SCP authentication communication with a second private key, and transmit the second signed SCP authentication communication to the SCP subsystem 304 in the computing system 202*a*/300, while the SCP subsystem 304 in the computing system 202*a*/300 signs a first SCP authentication communication with a first private key, and transmits the first signed SCP authentication communication to the SCP subsystem 304 in the computing system 202*b*/300. The SCP subsystem 304 in the computing system 202*b*/300 may then authenticate the first SCP authentication communication using a first public key, the SCP subsystem 304 in the computing system 202*a*/300 may authenticate the second SCP authentication communication using a second public key and, in response, the SCP subsystems 304 in the computing systems 202*a*/300 and 202*b*/300 will establish the secure communication channel 600, as illustrated in FIG. 6B.

As also described in that application, the SCP subsystem 304 in the computing system 202*b*/300 may then identify the SCP subsystem 304 in the computing system 202*c*/300, sign a second SCP authentication communication with a second private key, and transmit the second signed SCP authentication communication to the SCP subsystem 304 in the computing system 202*c*/300, while the SCP subsystem 304 in the computing system 202*c*/300 signs a third SCP authentication communication with a third private key, and transmits the third signed SCP authentication communication to the SCP subsystem 304 in the computing system 202*b*/300. The SCP subsystem 304 in the computing system 202*b*/300 may then authenticate the third SCP authentication communication using a third public key, the SCP subsystem 304 in the computing system 202*c*/300 may authenticate the second SCP authentication communication using a second public key and, in response, the SCP subsystems 304 in the computing systems 202*b*/300 and 202*c*/300 will establish the secure communication channel 602, as illustrated in FIG. 6C.

As also described in that application, the SCP subsystem 304 in the computing system 202*b*/300 may then attest to the authentication of the SCP subsystem 304 in the computing system 202*c*/300 to the SCP subsystem 304 in the computing system 202*a*/300, and attest to the authentication of the SCP subsystem 304 in the computing system 202*a*/300 to the SCP subsystem 304 in the computing system 202*c*/300, which allows the SCP subsystems 304 in the computing systems 202*a*/300 and 202*c*/300 to establish the secure communication channel 604 (illustrated in FIG. 6D) without transmitting signed SCP authentication communications. As discussed below, following block 504, the enabling keys controlled by the distributed key management system of the present disclosure may provide for use of the secure communication channels 600, 602, and 604 by each of the SCP subsystems 304 in the computing systems 202*a*/300, 202*b*/300, and 202*c*/300 to securely exchange communications, and continued performance of the platform root-of-trust functionality discussed above by those SCP subsystems will ensure that the secure communication channels are only maintained with trusted SCP subsystems and/or computing systems.

The method 500 then proceeds to block 506 where a first key management subsystem in the first SCP subsystem retrieves one or more enabling keys and stores them in the first key management subsystem. In the specific example discussed below, at or prior to block 506, the key management subsystem 410 in the SCP subsystem 400 in the computing system 202*b*/300 may be designated as a "global key manager" for the distributed key management system of the present disclosure (e.g., by the management system 206), and one of skill in the art in possession of the present disclosure will appreciate that multiple different key management subsystems in SCP subsystems included in different computing systems may be designated as global key managers for redundancy considerations. Thus, a subset of the SCP subsystems included in the networked system 200 may be designated global key managers, while the remaining subset of SCP subsystems may not perform global key manager functionality.

As such, with reference to FIG. 7 and at block 506, the key management engine 410*a* in the key management subsystem 410 included in the SCP subsystem 304/400 in the computing system 202*b*/300 may perform enabling key retrieval operations 700 to retrieve one or more enabling keys (e.g., public/private key pair(s) that enable secure communication channel operations as discussed below, and/or other enabling keys known in the art) from the management system 206 (e.g., an SCP manager) via the network and its communication system 408, and securely store those enabling key(s) in its key management database 410*b*. However, while the enabling key(s) are illustrated and described as being retrieved from the management system 206, one of skill in the art in possession of the present disclosure will appreciate that the enabling key(s) of the present disclosure may be retrieved form other locations (e.g., other key management subsystems in other SCP subsystems, a network-attached storage system provided by the network-attached device(s) 208) while remaining within the scope of the present disclosure as well. Furthermore, in some examples, the enabling key(s) may be generated and/or otherwise created by a key management subsystem (i.e., rather than retrieving those enabling keys from a network-accessible management system).

Thus, in some embodiments, a key management subsystems in a subset of the SCP subsystems in the networked system 200 may operate as global key managers that operate to retrieve enabling key(s) from a network accessible management system, securely store those enabling key(s) for use by that SCP subsystem in the utilization of the secure communication channels 600, 602, and/or 604, and in some situations distribute those enabling key(s) to key management subsystems in other SCP subsystems in the networked system 200 (e.g., key management subsystems in SCP subsystems that do not operate as global key managers). As will be appreciated by one of skill in the art in possession of the present disclosure, the retrieval and storage of enabling key(s) by SCP subsystems at block 506 may be performed at any time during the method 500.

As such, as part of the establishment of the secure communication channels 600, 602, and 604 at block 504, key management subsystems in SCP subsystem(s) that are designated as global key managers may transmit the enabling key(s) to key management subsystems in SCP subsystem(s) that are not designated as global key managers. For example, the key management subsystem 410 in the SCP subsystem 304 included in the computing system 202b/300 may operate as a global key manager while the key management subsystems 410 in the SCP subsystems 304 included in the computing systems 202a/300 and 202c/300 do not, and thus following block 506, the key management subsystem 410 in the SCP subsystem 304 included in the computing system 202b/300 may securely transmit the enabling key(s) retrieved at block 506 via the secure communication channels 600 and 602 to the key management subsystems 410 in the SCP subsystems 304 included in the computing systems 202a/300 and 202c/300 (i.e., for storage in their respective key management databases 410b). Furthermore, one of skill in the art in possession of the present disclosure will appreciate how an enabling key governing model may be enforced by key management subsystems operating as global key managers, and may be used to determine which SCP subsystems may receive which enabling keys, what access particular enabling keys may be provide, etc. As such, following block 506, each of the key management subsystems 410 in the SCP subsystems 304 in the computing systems 202a/300, 202b/300, and 202c/300 may store enabling key(s) that are configured to allow communication by that SCP subsystem via one or more of the secure communication channels 600, 602, and/or 604.

The method 500 then proceeds to decision block 508 where it is determined whether an enabling key request has been received. In an embodiment, at block 508, the key management engine 410a in the key management subsystem 410 in any of the SCP subsystems 304 in the computing systems 202a-202c/300 may operate at decision block 508 to monitor for a request for enabling key(s) from the SCP engine 404 in that SCP subsystem 304/400. Thus, while the examples below illustrate and describe an enabling key request associated with the SCP subsystem 304 in the computing systems 202b/300, one of skill in the art in possession of the present disclosure will appreciate that enabling key requests may be provided in any SCP subsystem in any computing systems similarly to the manner described below. If at decision block 508, it is determined that an enabling key request has not been received, the method 500 returns to decision block 508. As such, the method 500 may loop such that the key management subsystem 410 in any of the SCP subsystems 304 in the computing systems 202a-202c/300 monitor for a request for enabling key(s) from the SCP engine 404 in that SCP subsystem 304/400 as long as that enabling key request has not been received.

Figure 8A:
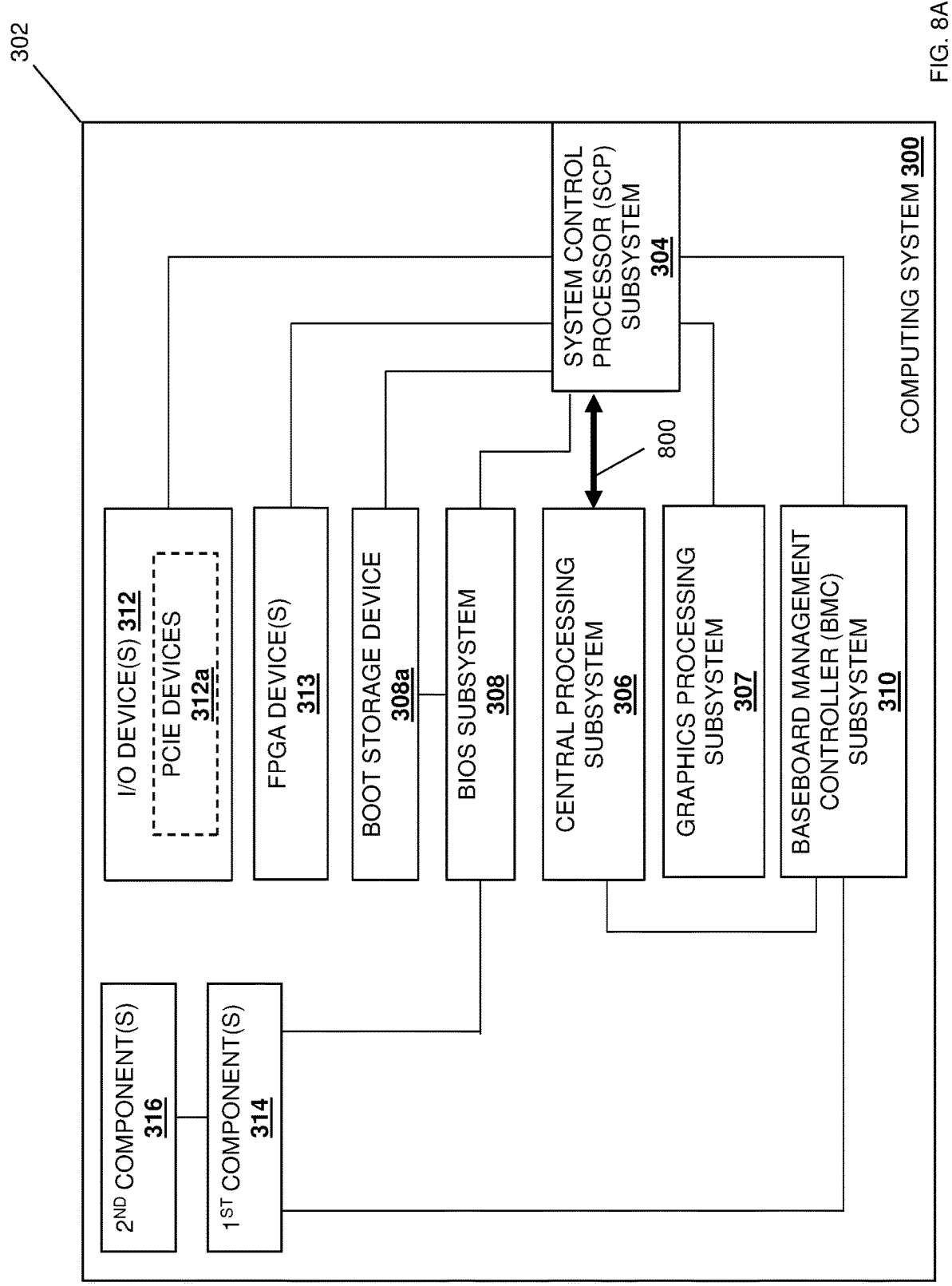
FIG. 8A is a schematic view illustrating an embodiment of the computing system of FIG. 3A operating during the method of FIG. 5.
Figure 8B:
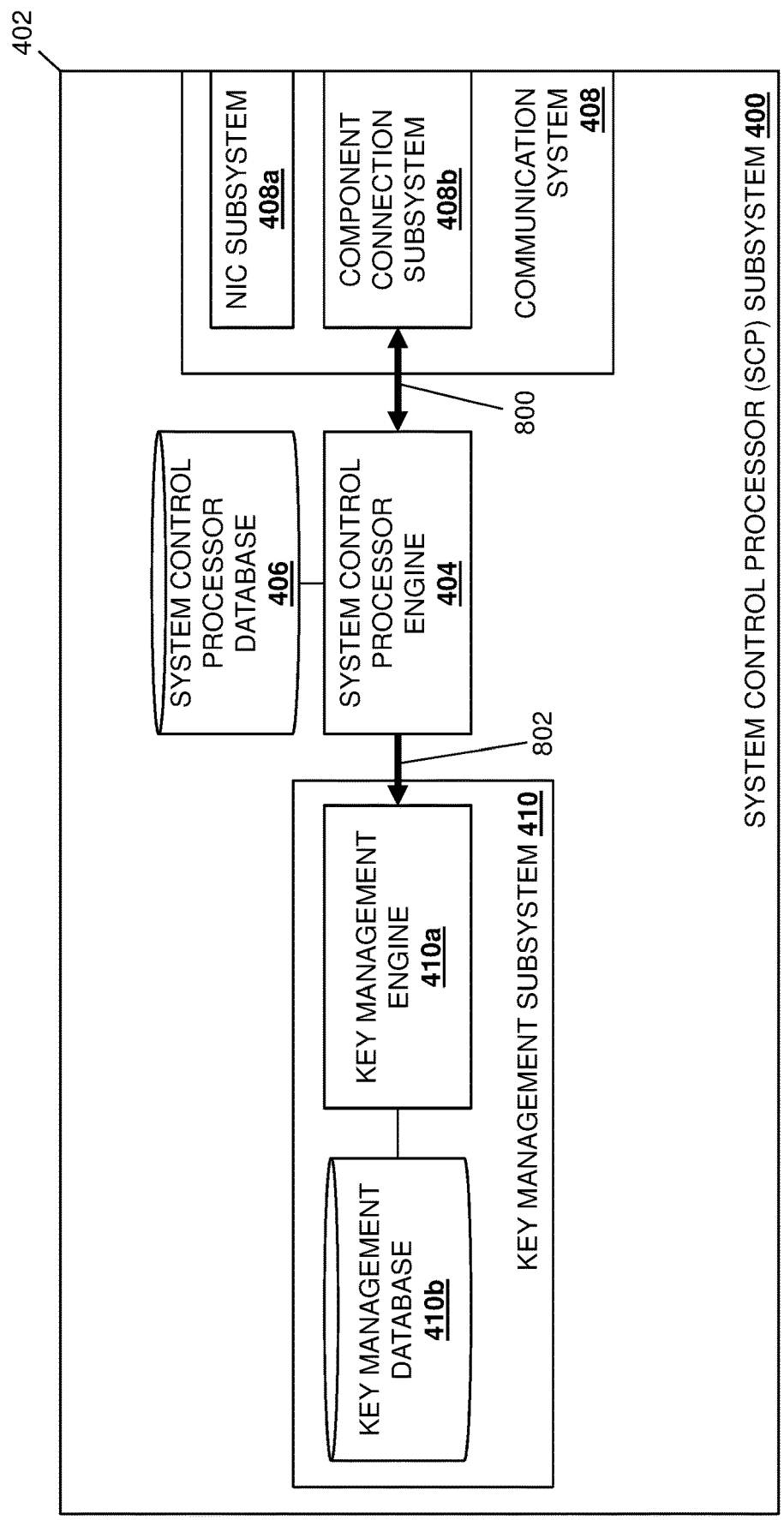
FIG. 8B is a schematic view illustrating an embodiment of the SCP subsystem of FIG. 4 operating during the method of FIG. 5.

If at decision block 508, it is determined that an enabling key request has been received, the method 500 proceeds to decision block 510 where it is determined whether the first SCP subsystem is trusted. With reference to FIGS. 8A and 8B, in an embodiment of decision block 508, an application provided by the central processing subsystem 306 in the computing system 202b/300 may perform application operations 800 with the SCP engine 404 in the SCP subsystem 304/400 in the computing system 202b/300, and the SCP engine 404 may determine that those application operations 800 require communications via the secure communication channels 600 and/or 602 in order to, for example, enable some application functionality for the application provided by the central processing subsystem 306 in the computing system 202b/300. In response to determining that the application operations 800 require communications via the secure communication channels 600 and/or 602, the SCP engine 404 in the SCP subsystem 304/400 in the computing system 202b/300 may perform enabling key request operations 802 that include generating and transmitting an enabling key request to the key management engine 410a in the key management subsystem 410 included in the SCP subsystem 304/400 in the computing system 202b/400. However, while a specific example has been illustrated and described of a scenario in which an enabling key request is provided (e.g., to enable application functionality), one of skill in the art in possession of the present disclosure will recognize that a variety of scenarios that result in the transmission of an enabling key request will fall within the scope of the present disclosure as well.

As such, at decision block 508, the key management engine 410a in the key management subsystem 410 included in the SCP subsystem 304/400 in the computing system 202b/400 may receive the enabling key request and, in response, will operate at decision block 510 to determine whether the SCP subsystem 400 is trusted. For example, at decision block 510, the key management engine 410a in the key management subsystem 410 included in the SCP subsystem 304/400 in the computing system 202b/300 may operate to perform any of the platform root-of-trust operations described by the inventors of the present disclosure in U.S. patent application Ser. No. 17/027,835, filed on Sep. 22, 2020, the disclosure of which is incorporated herein by reference in its entirety, in order to determine whether the SCP subsystem 304/400 in the computing system 202b/300 is trusted, and/or whether the computing system 202b/300 is trusted.

In some embodiments, the trust determination performed at decision block 510 for the SCP subsystem 304/400 and/or its computing system 202b/300 may be performed in response to receiving the enabling key request at decision block 508, and thus may require the performance of any of the authentication, verification, and/or other trust determination operations described above. However, in other embodiments, the trust determination performed at decision block 510 for the SCP subsystem 304/400 and/or its computing system 202b/300 may be performed periodically during the method 500 as part of the platform root-of-trust operations described above, and thus the trust determination performed at decision block 510 for the SCP subsystem 304/400 and/or its computing system 202b/300 may simply require a determination of whether the most recent platform root-of-trust operations indicated that the SCP subsystem 304/400 and/or its computing system 202b/300 are currently trusted. Furthermore, one of skill in the art in possession of the present disclosure will recognize that the performance of periodic platform root-of-trust operations allows any SCP subsystem to be prevented from accessing enabling keys in the event a periodic platform root-of-trust operation determines that SCP subsystem (or its computing system) is not trusted. As such, while specific examples have been provided, one of skill in the art in possession of the present disclosure will appreciate that the determination of whether an SCP subsystem and/or its computing system are trusted may be performed in a variety of manners that will fall within the scope of the present disclosure as well.

Figure 9:
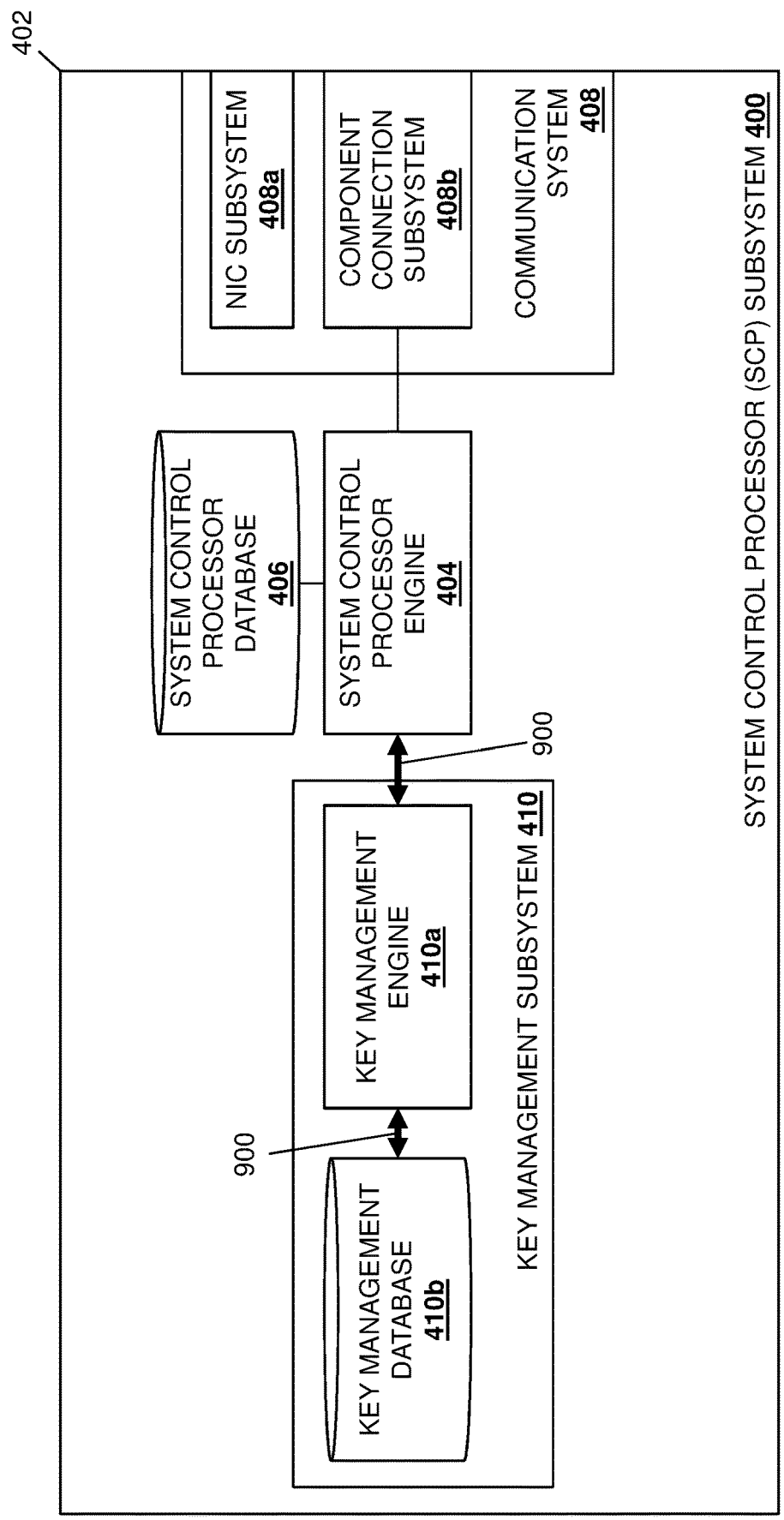
FIG. 9 is a schematic view illustrating an embodiment of the SCP subsystem of FIG. 4 operating during the method of FIG. 5.

If, at decision block 510, it is determined that the first SCP subsystem is trusted, the method 500 proceeds to block 512 where the first key management subsystem provides the first SCP subsystem access to the enabling key(s). With reference to FIG. 9, in an embodiment of block 512 and in response to receiving the enabling key request at decision block 508 and determining that the enabling key request was received from a trusted SCP subsystem at block 510, the key management engine 410a in the key management subsystem 410 in the SCP subsystem 304/400 in the computing system 202b/400 may perform enabling key provisioning operations 900 to provide the SCP engine 404 in the SCP subsystem 304/400 in the computing system 202b/400 access to the enabling keys in its key management database 410b by, for example, retrieving and transmitting those enabling keys to the SCP engine 404. Furthermore, in some examples, the key management subsystem in any SCP subsystem may add any trust-verified SCP subsystem to a trusted-SCP matrix that may be synchronized with other key management subsystems in other SCP subsystems in order to distribute the knowledge of trusted SCP subsystems throughout the networked system 200.

Figure 10A:
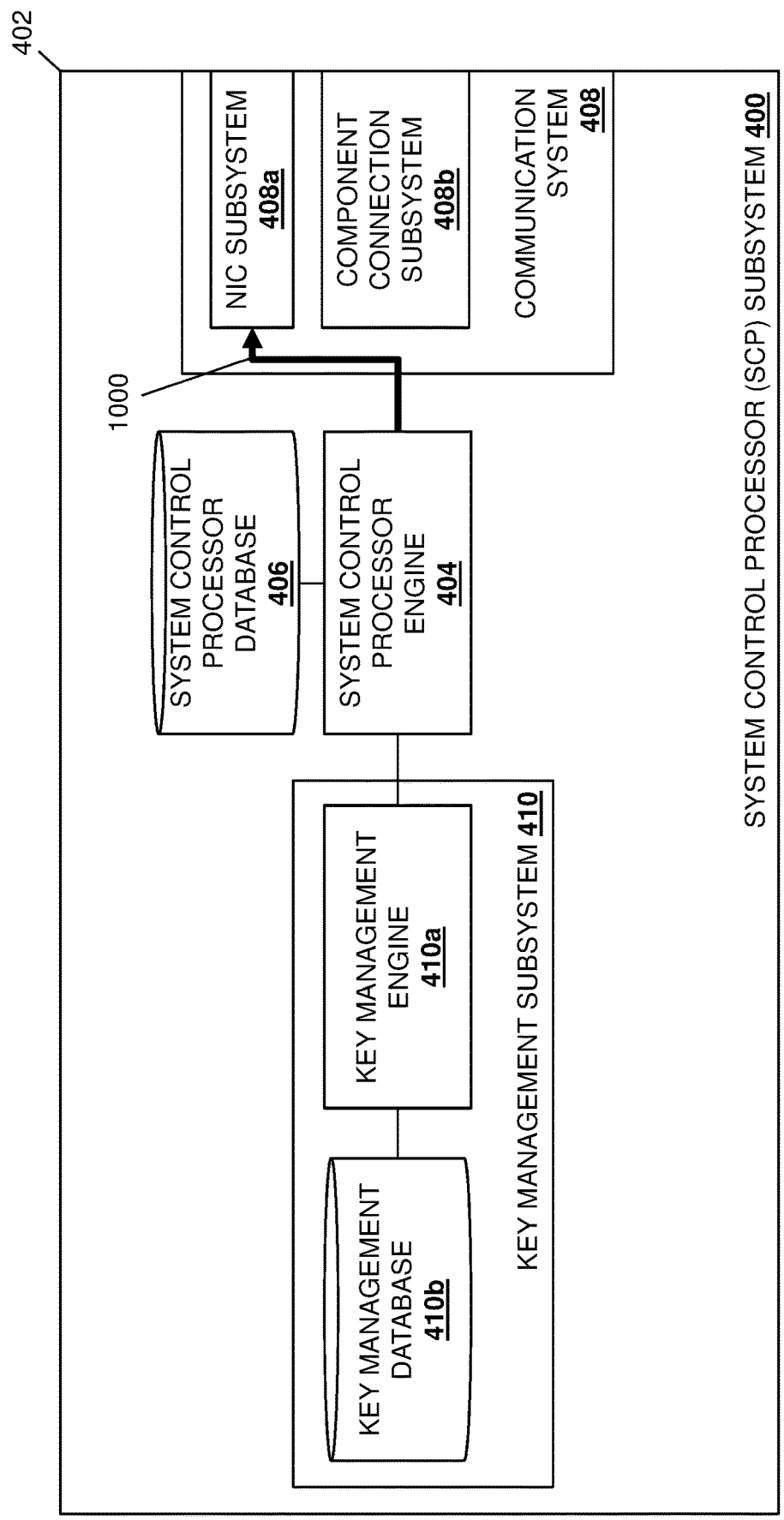
FIG. 10A is a schematic view illustrating an embodiment of the SCP subsystem of FIG. 4 operating during the method of FIG. 5.
Figure 10B:
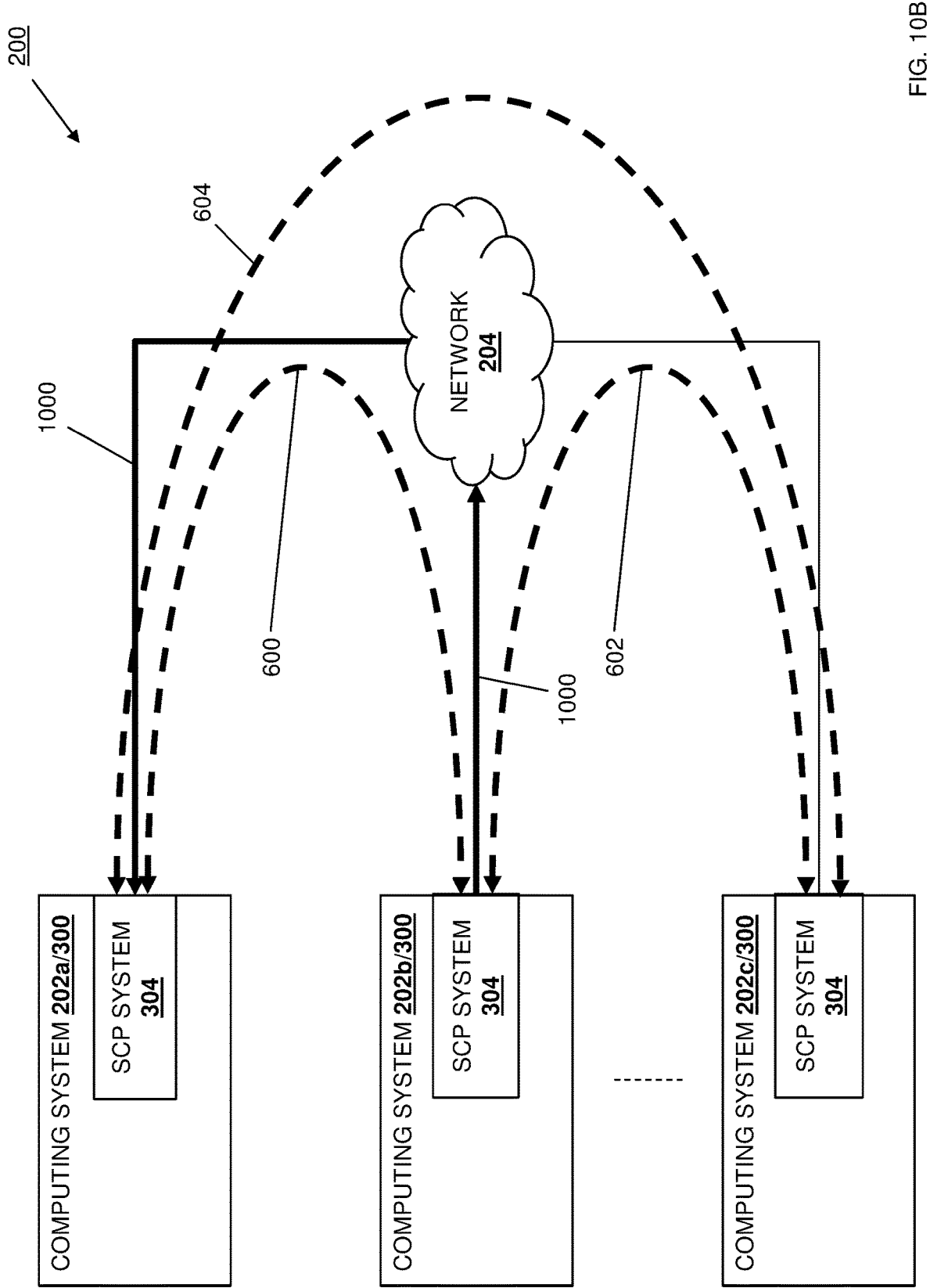
FIG. 10B is a schematic view illustrating an embodiment of the networked system of FIG. 2 with the computing system 300 of FIG. 3 having the SCP subsystem of FIG. 4 and operating during the method of FIG. 5.

As will be appreciated by one of skill in the art in possession of the present disclosure, and as illustrated in FIGS. 10A and 10B, the SCP engine 404 in the SCP subsystem 304/400 in the computing system 202b/400 may then perform secure communication operations 1000 that may include using the enabling key(s) received from the key management subsystem 410 to validate and transmit communications via the NIC subsystem 408a in its communication system 408 and through the network 204 to the computing system 202a/300 using the secure communication channel 600. While not illustrated or described in detail herein, one of skill in the art in possession of the present disclosure will appreciate that the SCP engine 404 in the SCP subsystem 304/400 included in the computing system 202a/300 may perform operations similar to those described above by the SCP engine 404 in the SCP subsystem 304/400 included in the computing system 202b/300 in order to utilize the secure communication channel 600 and respond (or otherwise communicate) with the SCP engine 404 in the SCP subsystem 304/400 in the computing system 202b/400.

If, at decision block 510, it is determined that the first SCP subsystem is not trusted, the method 500 proceeds to block 512 where the first key management subsystem prevents the first SCP subsystem from accessing the enabling key(s). In an embodiment, at block 514 and in response to receiving the enabling key request at decision block 508 and determining that the enabling key request was received from an untrusted SCP subsystem at block 510, the key management engine 410a in the key management subsystem 410 in the SCP subsystem 304/400 in the computing system 202b/400 may operate to prevent the SCP engine 404 in the SCP subsystem 304/400 in the computing system 202b/400 from accessing enabling key(s) stored in the key management database 410b by, for example, erasing, deleting, and/or otherwise removing the enabling keys from that key management database 410b. Furthermore, in some examples, the key management subsystem in any SCP subsystem may add any untrusted SCP subsystem to an untrusted-SCP blacklist that may be synchronized with other key management subsystems in other SCP subsystems in order to distribute the knowledge of untrusted SCP subsystems throughout the networked system 200.

However, while enabling key access prevention is described herein as including the erasure, deletion, and/or other removal of the enabling keys from a key management database, one of skill in the art in possession of the present disclosure will appreciate that access to enabling keys may be prevented while allowing those enabling keys to remain in the key management database while remaining within the scope of the present disclosure as well. For example, the key management subsystem 410 in the SCP subsystem 304/400 in the computing system 202b/400 may operate to prevent the SCP engine 404 in the SCP subsystem 304/400 in the computing system 202b/400 from accessing enabling key(s) stored in the key management database 410b by, for example, erasing, deleting, and/or otherwise removing the key access keys that previously enabled that SCP subsystem to access the key management database 410b. In a specific example, enabling keys may be allowed to remain in the key management subsystem of an untrusted SCP subsystem when that SCP subsystem is the only SCP subsystem in the networked system 200 (e.g., a "stand-alone" SCP subsystem). As such, any SCP subsystem or computing system that is no longer trusted is prevented from utilizing the secure communication channels 600, 602, and/or 604 via their inability to access the enabling keys stored in key management subsystem in that SCP subsystem.

The method 500 then proceeds to decision block 516 where it is determined whether the first SCP subsystem is trusted. Similarly as discussed above with regard to decision block 510, in embodiments of block 516 and following a determination that the SCP subsystem 304/400 in the computing system 202b/300 (or that computing system 202b/300) is untrusted, the key management engine 410a in the key management subsystem 410 included in the SCP subsystem 304/400 in the computing system 202b/300 may operate to periodically perform any of the platform root-of-trust operations described by the inventors of the present disclosure in U.S. patent application Ser. No. 17/027,835, filed on Sep. 22, 2020, the disclosure of which is incorporated herein by reference in its entirety, in order to determine whether the SCP subsystem 304/400 in the computing system 202b/300 is once again trusted, and/or whether the computing system 202b/300 is once again trusted.

If at decision block 516, it is determined that the first SCP subsystem is not trusted, the method 500 returns to block 514. As such, the method 500 may loop such that the key management engine 410a in the key management subsystem 410 included in the SCP subsystem 304/400 in the computing system 202b/300 continues to prevent the SCP engine 404 in the SCP subsystem 304/400 in the computing system 202b/300 from accessing the enabling key(s) in its key management database 410b as long as that SCP subsystem (or its computing system) is not trusted. If at decision block 516, it is determined that the first SCP subsystem is trusted, the method 500 proceeds to block 512. As such, in response to determining that SCP subsystem 304/400 in the computing system 202*b*/300 (or that computing system 202*b*/300) is once again trusted at decision block 516, the key management engine 410*a* in the key management subsystem 410 in the SCP subsystem 304/400 in the computing system 202*b*/400 may operate to provide the SCP engine 404 in the SCP subsystem 304/400 in the computing system 202*b*/400 access to the enabling keys in its key management database 410*b* by, for example, retrieving and transmitting those enabling keys to the SCP engine 404.

As such, in embodiments in which the enabling keys were erased, deleted, or otherwise removed from its key management database 410*b* in response to detecting an untrusted SCP subsystem, the key management engine 410*a* in the key management subsystem 410 in the SCP subsystem 304/400 in the computing system 202*b*/400 may again retrieve those enabling keys similarly as described above with regard to block 506, and then provide those enabling keys to the SCP engine 404 in the SCP subsystem 304/400 in the computing system 202*b*/400. However, in embodiments where the enabling keys remained in its key management database 410*b* at block 514, the key management engine 410*a* in the key management subsystem 410 in the SCP subsystem 304/400 in the computing system 202*b*/400 may provide those enabling keys to the SCP engine 404 in the SCP subsystem 304/400 in the computing system 202*b*/400 (e.g., by issuing a new key store access key to that SCP subsystem 304/400.

Thus, with reference again to FIGS. 10A and 10B and following re-entry to a trusted state, the SCP engine 404 in the SCP subsystem 304/400 in the computing system 202*b*/400 may perform secure communication operations 1000 that may include using the enabling key(s) received from the key management subsystem 410 to validate communications and transmit those communications via the NIC subsystem 408*a* in its communication system 408 and through the network 204 to the computing system 202*a*/300 using the secure communication channel 600. While not illustrated or described in detail herein, one of skill in the art in possession of the present disclosure will appreciate that the SCP engine 404 in the SCP subsystem 304/400 included in the computing system 202*a*/300 may perform operations similar to those described above by the SCP engine 404 in the SCP subsystem 304/400 included in the computing system 202*b*/300 in order to utilize the secure communication channel 600 and respond (or otherwise communicate) with the SCP engine 404 in the SCP subsystem 304/400 in the computing system 202*b*/400.

Figure 11:
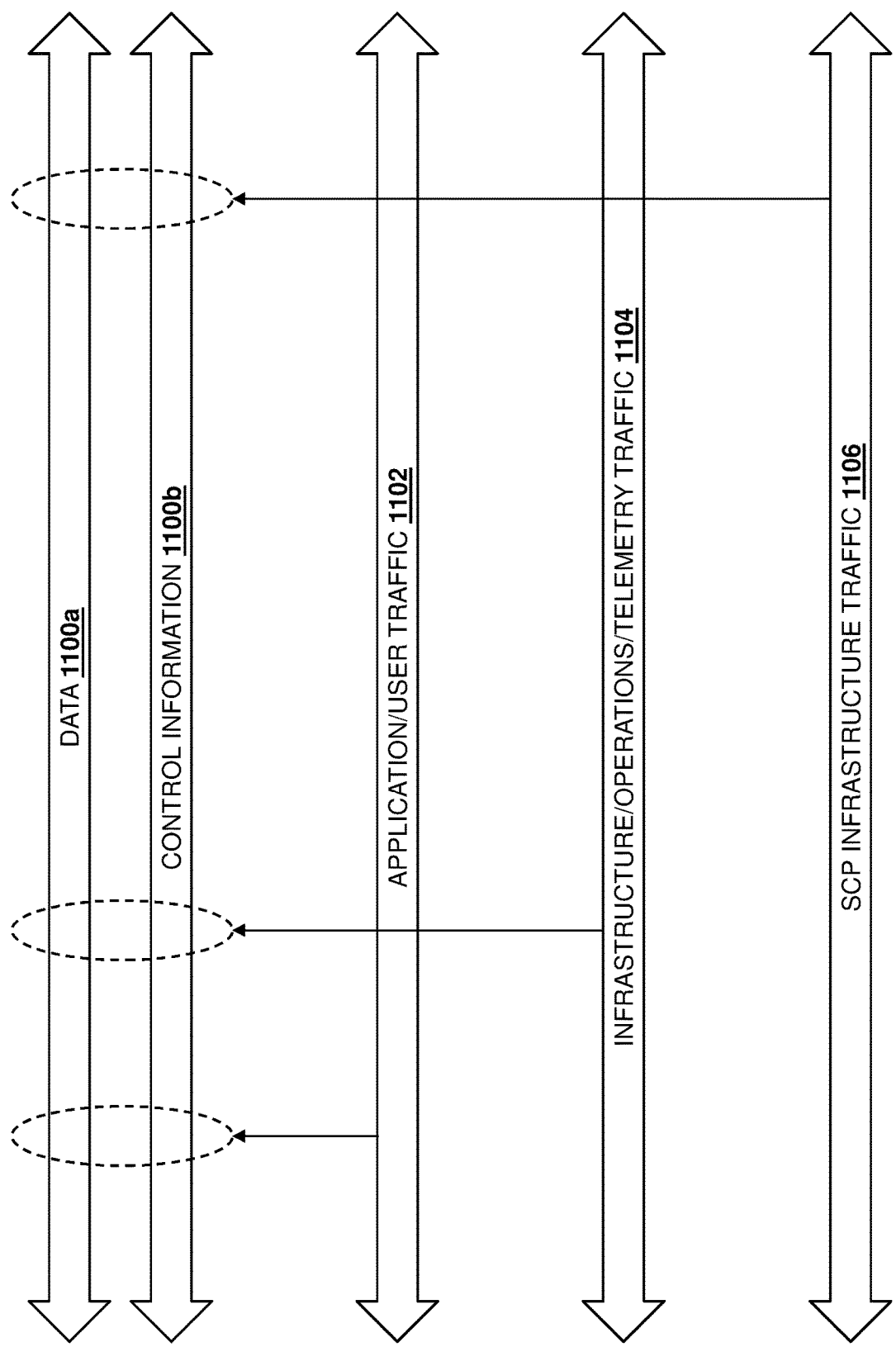
FIG. 11 is a schematic view illustrating communication channels provided according to the method of FIG. 5.

With reference to FIG. 11, an embodiment of communications that may be provided between SCP subsystems in the networked system 200 is illustrated, with Ethernet communications allowing for the transmission of data 1100*a* and control information 1100*b*. As can be seen in the FIG. 11, application/user traffic 1102 that includes data 1100*a* and control information 1100*b* may be provided by the SCP subsystems in the networked system 200, and infrastructure/operations/telemetry traffic 1104 that includes data 1100*a* and control information 1100*b* may be provided by the SCP subsystems in the networked system 200 as well, using unsecured or relatively less secure communications channels. Furthermore, FIG. 11 also illustrated how SCP infrastructure traffic 1106 that includes data 1100*a* and control information 1100*b* may be provided by the SCP subsystems in the networked system 200 using secure communications channels, the access to which is restricted via enabling keys provided using the distributed key management system of the present disclosure.

Thus, systems and methods have been described that utilize SCP subsystems that provide a platform root-of-trust for their server device, and that also operate to establish distributed secure communication with each other, in order to provide a distributed, immutable, key management system for use by the SCP subsystems in communicating via a secure SCP communication fabric. For example, the distributed key management system of the present disclosure includes a first SCP subsystem coupled to second SCP subsystems via a network. The first SCP subsystem establishes secure communication channels with the second SCP subsystems, and a first key management subsystem in the first SCP subsystem retrieves enabling key(s) for communicating via the secure communication channels from a second key management subsystem in one of the second SCP subsystems, and stores the enabling key(s). The first key management subsystem then receives a first enabling key request from the first SCP subsystem and determines whether the first SCP subsystem is trusted. If the first SCP subsystem is trusted, the first key management subsystem provides the first SCP subsystem access to the at least one enabling key. If the first SCP subsystem is not trusted, the first key management subsystem prevents the first SCP subsystem from accessing the at least one enabling key stored. As such, the SCP subsystems provide a secure (impenetrable from both outside and inside threats), highly available (no single points of failure), and immutable key management system that issues keys and manages those keys via an infrastructure service that cannot be accessed or modified from an untrusted external source.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A distributed key management system, comprising:
a plurality of second System Control Processor (SCP) subsystems that each include a respective second key management subsystem;
a first SCP subsystem that is included in a first computing system and that coupled to the plurality of second SCP subsystems via a network; and
a first key management subsystem that is included in the first SCP subsystem and that is configured, in response to the first SCP subsystem establishing respective secure communication channels with each of the plurality of second SCP subsystems, to:
retrieve, from one of the second key management subsystems in one of the plurality of second SCP subsystems, at least one enabling key for communicating via the respective secure communication channels with each of the plurality of second SCP subsystems;
store the at least one enabling key in a first key management database that is included in the first key management subsystem;
receive, from the first SCP subsystem, a first enabling key request;
determine whether the first SCP subsystem is trusted;

erase, in response to receiving the first enabling key request and determining that the first SCP subsystem is not trusted, the at least one enabling key from the first key management database;

determine, subsequent to erasing the at least one enabling key from the first key management database, that the first SCP subsystem is trusted;

retrieve, in response to determining that the first SCP subsystem is trusted subsequent to erasing the at least one enabling key from the first key management database, the at least one enabling key from the second key management subsystem in one of the plurality of second SCP subsystems; and store, in response to retrieving the at least one enabling key after determining that the first SCP subsystem is trusted subsequent to erasing the at least one enabling key from the first key management database, the at least one enabling key in the first key management database.

2. The system of claim 1, wherein the first SCP subsystem is configured to:

authenticate a plurality of first computing devices in the first computing system, and wherein the determining that the first SCP subsystem is trusted includes determining that the first SCP subsystem has authenticated the plurality of first computing devices in the first computing system.

3. The system of claim 1, wherein the first SCP subsystem is configured to:

identify the plurality of second SCP subsystems and, in response, establish the respective secure communication channels with each of the plurality of second SCP subsystem.

4. The system of claim 1, wherein the first key management subsystem is configured to:

provide, in response to receiving the first enabling key request and determining that the first SCP subsystem is trusted, the first SCP subsystem access to the at least one enabling key stored in the first key management database.

5. The system of claim 1, wherein the first key management subsystem is configured to:

receive, from at least one of the plurality of second SCP subsystems, a second enabling key request;

determine whether the at least one of the plurality of second SCP subsystems is trusted;

provide, in response to receiving the second enabling key request and determining that the at least one of the plurality of second SCP subsystems is trusted, the at least one of the plurality of second SCP subsystems access to the at least one enabling key stored in the first key management database; and prevent, in response to receiving the second enabling key request and determining that the at least one of the plurality of second SCP subsystems is not trusted, the at least one of the plurality of second SCP subsystems from accessing the at least one enabling key stored in the first key management database.

6. The system of claim 5, wherein the first key management subsystem is configured to receive the second enabling key request in response to:

receiving a global key manager designation communication that identifies the first key management subsystem as a global key manager.

7. An Information Handling System (IHS), comprising:
a first processing subsystem;
a first memory subsystem that is coupled to the first processing subsystem and that includes instructions that, when executed by the first processing subsystem, cause the first processing subsystem to provide an enabling key utilization engine;
a second processing subsystem that is coupled to the first processing subsystem;
a second memory subsystem that is coupled to the second processing subsystem and that includes instructions that, when executed by the second processing subsystem, cause the second processing subsystem to provide a key management engine that is configured to:

retrieve, from a key management subsystem in one of a plurality of second System Control Processor (SCP) subsystems, at least one enabling key for communicating via respective secure communication channels with each of the plurality of second SCP subsystems;

store the at least one enabling key in a key management database that is coupled to the second processing subsystem;

receive, from the enabling key utilization engine, a first enabling key request;

determine whether the IHS is trusted;

erase, in response to receiving the first enabling key request and determining that the IHS is not trusted, the at least one enabling key from the key management database;

determine, subsequent to erasing the at least one enabling key from the key management database, that the IHS is trusted;

retrieve, in response to determining that the IHS is trusted subsequent to erasing the at least one enabling key from the key management database, the at least one enabling key from the key management subsystem in one of the plurality of second SCP subsystems; and store, in response to retrieving the at least one enabling key after determining that the IHS is trusted subsequent to erasing the at least one enabling key from the key management database, the at least one enabling key in the key management database.

8. The IHS of claim 7, wherein the enabling key utilization engine is configured to:

authenticate a plurality of IHS devices in the IHS, and wherein the determining that the IHS is trusted includes determining that the enabling key utilization engine has authenticated the plurality of IHS devices in the IHS.

9. The IHS of claim 7, wherein the enabling key utilization engine is configured to:

identify the plurality of second SCP subsystems and, in response, establish the respective secure communication channels with each of the plurality of second SCP subsystem.

10. The IHS of claim 7, wherein the key management engine is configured to:

provide the enabling key utilization engine access to the at least one enabling key that was retrieved and stored in the key management database in response to determining that the IHS is trusted and subsequent to erasing the at least one enabling key from the key management database.

11. The IHS of claim 7, wherein the key management engine is configured to:
provide, in response to receiving the first enabling key request and determining that the IHS is trusted, the enabling key utilization engine access to the at least one enabling key stored in the key management database.

12. The IHS of claim 7, wherein the key management engine is configured to:
receive, from at least one of the plurality of second SCP subsystems, a second enabling key request;
determine whether the at least one of the plurality of second SCP subsystems is trusted;
provide, in response to receiving the second enabling key request and determining that the at least one of the plurality of second SCP subsystems is trusted, the at least one of the plurality of second SCP subsystems access to the at least one enabling key stored in the key management database; and
prevent, in response to receiving the second enabling key request and determining that the at least one of the plurality of second SCP subsystems is not trusted, the at least one of the plurality of second SCP subsystems from accessing the at least one enabling key stored in the key management database.

13. The IHS of claim 12, wherein the key management engine is configured to receive the second enabling key request in response to:
receiving a global key manager designation communication that identifies the key management engine as a global key manager.

14. A method for providing distributed key management, comprising:
retrieving, by a first key management subsystem in a first System Control Processor (SCP) subsystem from a second key management subsystem in one of a plurality of second SCP subsystems, at least one enabling key for communicating via respective secure communication channels with each of the plurality of second SCP subsystems;
storing, by the first key management subsystem, the at least one enabling key in the first key management subsystem;
receiving, by the first key management subsystem from the first SCP subsystem, a first enabling key request;
determining, by the first key management subsystem, whether the first SCP subsystem is trusted;
erasing, by the first key management subsystem in response to receiving the first enabling key request and determining that the first SCP subsystem is not trusted, the at least one enabling key from the first key management subsystem;
determining, by the first key management subsystem subsequent to erasing the at least one enabling key from the first key management database, that the first SCP subsystem is trusted;
retrieving, by the first key management subsystem in response to determining that the first SCP subsystem is trusted subsequent to erasing the at least one enabling key from the first key management database, the at least one enabling key from a second key management subsystem in one of the plurality of second SCP subsystems; and storing, by the first key management subsystem in response to retrieving the at least one enabling key after determining that the first SCP subsystem is trusted subsequent to erasing the at least one enabling key from the first key management database, the at least one enabling key in the first key management database.

15. The method of claim 14, further comprising:
authenticating, by the first SCP subsystem, a plurality of devices included in a first computing system with the first SCP subsystem, and wherein the determining that the first SCP subsystem is trusted includes determining that the first SCP subsystem has authenticated the plurality of devices in the first computing system.

16. The method of claim 14, further comprising:
identifying, by the first SCP subsystem, the plurality of second SCP subsystems and, in response, establishing the respective secure communication channels with each of the plurality of second SCP subsystem.

17. The method of claim 14, further comprising:
providing, by the first key management subsystem, the first SCP subsystem access to the at least one enabling key that was retrieved and stored in the first key management database in response to determining that the first SCP subsystem is trusted and subsequent to erasing the at least one enabling key from the first key management database.

18. The method of claim 14, further comprising:
providing, by the first key management subsystem in response to receiving the first enabling key request and determining that the first SCP subsystem is trusted, the first SCP subsystem access to the at least one enabling key stored in the first key management database.

19. The method of claim 14, further comprising:
receiving, by the first key management subsystem from at least one of the plurality of second SCP subsystems, a second enabling key request;
determining, by the first key management subsystem, whether the at least one of the plurality of second SCP subsystems is trusted;
providing, by the first key management subsystem in response to receiving the second enabling key request and determining that the at least one of the plurality of second SCP subsystems is trusted, the at least one of the plurality of second SCP subsystems access to the at least one enabling key stored in the first key management subsystem; and
preventing, by the first key management subsystem in response to receiving the second enabling key request and determining that the at least one of the plurality of second SCP subsystems is not trusted, the at least one of the plurality of second SCP subsystems from accessing the at least one enabling key stored in the first key management subsystem.

20. The method of claim 19, wherein the first key management subsystem is configured to receive the second enabling key request in response to:
receiving a global key manager designation communication that identifies the key management engine as a global key manager.

* * * * *